(12) United States Patent
Shaheen et al.

(10) Patent No.: US 10,986,527 B2
(45) Date of Patent: Apr. 20, 2021

(54) METHOD AND APPARATUS FOR INDICATING RESTRICTED RESOURCES OF WIRELESS TERMINAL AND FOR INDICATING ACCESS NODE CAPABILITY TO SUPPORT CONNECTION WITH A WIRELESS TERMINAL WITH RESTRICTED CAPABILITIES

(71) Applicants: Sharp Laboratories of America, Inc., Vancouver, WA (US); FG Innovation Company Limited, Tuen Mun (HK)

(72) Inventors: Kamel M. Shaheen, Camas, WA (US); Edward Masami Sugiyama, Vancouver, WA (US); Tatsushi Aiba, Vancouver, WA (US); Kazunari Yokomakura, Vancouver, WA (US); Atsushi Ishii, Vancouver, WA (US)

(73) Assignees: SHARP Laboratories of America, Inc.; FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/441,311

(22) Filed: Jun. 14, 2019

(65) Prior Publication Data
US 2019/0394668 A1 Dec. 26, 2019

Related U.S. Application Data

(63) Continuation of application No. PCT/US2019/037113, filed on Jun. 13, 2019.
(Continued)

(51) Int. Cl.
*H04W 4/00* (2018.01)
*H04W 28/02* (2009.01)
(Continued)

(52) U.S. Cl.
CPC ... *H04W 28/0215* (2013.01); *H04M 1/72577* (2013.01); *H04W 8/186* (2013.01); *H04W 72/048* (2013.01); *H04W 76/27* (2018.02)

(58) Field of Classification Search
None
See application file for complete search history.

(56) References Cited

U.S. PATENT DOCUMENTS

2007/0147377 A1  6/2007 Laroi et al.
2012/0264449 A1  10/2012 Kazmi et al.
(Continued)

FOREIGN PATENT DOCUMENTS

WO  WO 2015/092114 A1  6/2015

OTHER PUBLICATIONS

3GPP TSG-RAN WG2 Meeting #102, R2-1808264, Huawei, HiSilicon, "Discussion on UE temporary access capability restriction", Busan, Korea, May 21-25, 2018.
(Continued)

*Primary Examiner* — Phirin Sam
(74) *Attorney, Agent, or Firm* — ScienBiziP, P.C.

(57) ABSTRACT

An access node of a radio access network (RAN) that communicates over a radio interface with a wireless terminal. The access node comprises processor circuitry, transmitting circuitry, and receiving circuitry. The processor circuitry is configured to generate an indication of access node capability to support the wireless terminal when the wireless terminal operates in a restricted mode. The transmitting circuitry is configured to transmit the indication to the wireless terminal. The receiving circuitry is configured to receive an indication from the wireless terminal that the wireless terminal is in the restricted mode. The processor circuitry is further configured to make a determination, upon receipt of the indication from the wireless terminal, that a
(Continued)

connection with the wireless terminal can be maintained in the restricted mode and to generate a responsive message based on the determination.

20 Claims, 18 Drawing Sheets

Related U.S. Application Data

(60) Provisional application No. 62/688,902, filed on Jun. 22, 2018.

(51) Int. Cl.
*H04W 72/04* (2009.01)
*H04W 76/27* (2018.01)
*H04M 1/725* (2021.01)
*H04W 8/18* (2009.01)

(56) References Cited

U.S. PATENT DOCUMENTS

| | | | |
|---|---|---|---|
| 2013/0034046 A1* | 2/2013 | Ishii | H04W 12/003 370/315 |
| 2014/0112247 A1* | 4/2014 | Chen | H04W 8/24 370/328 |
| 2016/0174150 A1* | 6/2016 | Comsa | H04W 36/0094 370/311 |
| 2018/0098311 A1* | 4/2018 | Hong | H04W 72/0406 |
| 2019/0104474 A1* | 4/2019 | Raghunathan | H04W 52/0251 |
| 2019/0182764 A1* | 6/2019 | Nader | H04W 48/12 |

OTHER PUBLICATIONS

3GPP TSG-RAN WG2 Meeting #102, R2-R2-1807607, vivo, "UE radio access capabilities change", Busan, Korea, May 21-25, 2018.
3GPP TSG-RAN WG2 Meeting #102, R2-R2-1807534, Qualcomm Incorporated, "Temporary Capability Restriction for standalone NR", Busan, Korea, May 21-25, 2018.
3GPP TSG-RAN WG2 Meeting #102, R2-R2-1807084, Ericsson, "UE Capability Restrictions", Busan, Korea, May 21-25, 2018.
3GPP TS 36.331 V15.1.0 (Mar. 2018), Technical Specification, 3rd Generation Partnership Project; Technical Specification Group Radio Access Network; Evolved Universal Terrestrial Radio Access (E-UTRA); Radio Resource Control (RRC);Protocol specification (Release 15).
3GPP TS 38.331 V15.1.0 (Mar. 2018), Technical Specification, 3rd Generation Partnership Project; Technical Specification Group Radio Access Network; NR; Radio Resource Control (RRC) protocol specification (Release 15).
International Search Report and Written Opinion dated Sep. 9, 2019 in PCT Application PCT/US2019/37113.

\* cited by examiner

METHOD AND APPARATUS FOR INDICATING RESTRICTED RESOURCES OF WIRELESS TERMINAL AND FOR INDICATING ACCESS NODE CAPABILITY TO SUPPORT CONNECTION WITH A WIRELESS TERMINAL WITH RESTRICTED CAPABILITIES

This application claims the priority and benefit of U.S. provisional application 62/688,902, filed Jun. 22, 2018, entitled "METHODS AND APPARATUS FOR INDICATING RESTRICTED RESOURCES OF WIRELESS TERMINAL AND FOR INDICATING ACCESS NODE CAPABILITY TO SUPPORT CONNECTION WITH A WIRELESS TERMINAL WITH RESTRICTED CAPABILITIES", and is a continuation of PCT Patent Application PCT/US19/37113, filed Jun. 13, 2019, entitled "METHODS AND APPARATUS FOR INDICATING RESTRICTED RESOURCES OF WIRELESS TERMINAL AND FOR INDICATING ACCESS NODE CAPABILITY TO SUPPORT CONNECTION WITH A WIRELESS TERMINAL WITH RESTRICTED CAPABILITIES", both of which are incorporated by reference herein in their entirety.

TECHNICAL FIELD

The technology relates to wireless communications, and particularly to methods, apparatus, and techniques for requesting, transmitting, updating, and using system information (SI) in wireless communications.

BACKGROUND

In wireless communication systems, a radio access network generally comprises one or more access nodes (such as a base station) which communicate on radio channels over a radio or air interface with plural wireless terminals. In some technologies such a wireless terminal is also called a User Equipment (UE). A group known as the 3rd Generation Partnership Project ("3GPP") has undertaken to define globally applicable technical specifications and technical reports for present and future generation wireless communication systems. The 3GPP Long Term Evolution ("LTE") and 3GPP LTE Advanced (LTE-A) are projects to improve an earlier Universal Mobile Telecommunications System ("UMTS") mobile phone or device standard in a manner to cope with future requirements.

In typical cellular mobile communication systems, the base station broadcasts on radio channels certain information which is required for mobile stations to access to the network. In Long-Term Evolution (LTE) and LTE Advanced (LTE-A), such information is called "system information" ("SI"). Each access node, such as an evolved NodeB ("eNB") or a gNodeB ("gNB") in the 5G New Radio (NR) System, broadcasts such system information to its coverage area via a Master Information Block (MIB) and several System Information Blocks (SIBs) on downlink radio resources allocated to the access node.

3rd Generation Partnership Project ("3GPP") documents describe how capabilities of the wireless terminal (UE) may be communicated to the access node. See, for example, 3GPP TS 36.331 V15.1.0 (2018-03), Technical Specification, 3rd Generation Partnership Project; Technical Specification Group Radio Access Network; Evolved Universal Terrestrial Radio Access (E-UTRA); Radio Resource Control (RRC); Protocol specification (Release 15) and 3GPP TS 38.331 V15.1.0(2018-03)3rd Generation Partnership Project; Technical Specification Group Radio Access Network; NR; Radio Resource Control (RRC) protocol specification, Release 15, both of which are incorporated herein by reference in their entirety. For example, section 5.6.3 of TS 36.331 describes a procedure wherein an eNB and/or gNB can request the UE to transfer a list of certain capabilities as determined by eNB/gNB. The purpose of the procedure, shown also in FIG. 1, is to transfer UE radio access capability information from the UE to E-UTRAN. If the UE has changed its E-UTRAN radio access capabilities, the UE shall request higher layers to initiate the necessary non-access stratum (NAS) procedures (see 3GPP TS 23.401) that would result in the update of UE radio access capabilities using a new RRC connection. The E-UTRAN initiates the procedure to a UE in RRC_CONNECTED when it needs (additional) UE radio access capability information. The E-UTRAN also determines which list of capabilities is requested as described in 3GPP TS 36.331 v.15.1, § 5.6.6.3.

Currently, 3GPP RAN2 is discussing ways to introduce new and enhanced features while also to reducing signaling. Information about the UE capability is one of these issues under considerations in New Radio (NR) design. It was agreed in RAN2#97 that the following are important to consider in developing a general solution to the capability issue:

1: Hardware sharing between New Radio (NR) and other things, e.g. Wireless Local Area Network (LAN), Bluetooth® (BT), Global Positioning System (GPS), etc;
2: Interference between New Radio (NR) and other things, e.g. WLAN, BT, GPS, etc;
3: Exceptional UE issues (e.g. overheating problems)

It was also agreed that UE radio access capabilities are generally to be considered as static and therefore that any change to UE radio access capabilities is considered to temporarily (e.g., under network control) limit the availability of some capabilities, e.g., due to hardware sharing, interference or overheating.

Furthermore, it was agreed that a temporary capability restriction should be RAN-specific, and thus transparent to the Next Generation (NG) core, i.e., only a static capability is stored in the NG core and that the signaling concerning a temporary capability restriction request should be between the UE and an access node, e.g., the gNB.

Several proposals concerning UE radio access capabilities have been introduced, e.g., R2-1808264, R2-1807607, R2-1807534, R2-1807084, all of which are incorporated herein by reference in their entirety. However, these proposals add more complexity and procedural interactions between the UE and gNB which adversely affect overall performance and increase rather than reduce signaling.

What is needed, therefore, and an example object of the technology disclosed herein, are methods, apparatus, and techniques for determining/declaring and/or indicating/communicating UE capability limitation(s)/restriction(s) between a wireless terminal (UE) and an access node.

SUMMARY

In one of its example aspects the technology disclosed herein concerns a wireless terminal of a radio access network (RAN) that participates in communications over a radio interface with an access node of the RAN, and methods of operating such wireless terminal. The wireless terminal comprises processor circuitry, transmitter circuitry, and receiver circuitry. In an example embodiment and mode, the receiver circuitry is configured to receive from the access node an indication of access node capability to support the wireless terminal when the wireless terminal is operating in a restricted mode. The processor circuitry is configured to make a determination if the wireless terminal is or should be in a restrictive mode and, in response to the determination, to generate a message responsive to the indication of access node capability. The transmitter circuitry is configured to transmit the message to the access node.

In yet another of its example aspects the technology disclosed herein concerns an access node of a radio access network (RAN) that communicates over a radio interface with a wireless terminal, and methods of operating such access nodes. In an example embodiment and mode the access node comprises processor circuitry, transmitter circuitry, and receiver circuitry. The processor circuitry is configured to generate an indication of access node capability to support the wireless terminal when the wireless terminal operates in a restricted mode. The transmitter circuitry is configured to transmit the indication to the wireless terminal. The receiver circuitry is configured to receive an indication from the wireless terminal that the wireless terminal is in the restricted mode. The processor circuitry is further configured to make a determination, upon receipt of the indication from the wireless terminal, that a connection with the wireless terminal can be maintained in the restricted mode; and to generate a responsive message to the wireless terminal based on the determination.

In another of its example aspects the technology disclosed herein concerns a wireless terminal of a radio access network (RAN) that participates in communications over a radio interface with an access node of the RAN. The wireless terminal comprises processor circuitry and transmitter and receiver circuitry. In an example embodiment and mode, the receiver circuitry is configured to receive from the access node an indication as to the access node's capability to support one or more wireless terminals operating with one or more restricted capabilities (e.g., operating in SafeMode). If the access node transmission indicates it is not capable of supporting one or more wireless terminals operating with one or more restricted capabilities (e.g., operating in Safe-Mode), then the transmitter circuitry is configured to send a release indication (e.g., a Release message) to the access node. If the access node transmission indicates it is capable of supporting one or more wireless terminals operating with one or more restricted capabilities (e.g., operating in Safe-Mode), then the transmitter circuitry is configured to send a safe mode level message to the access node. In another of its example aspects the technology disclosed herein concerns methods of operation of such a wireless terminal.

In yet another of its example aspects the technology disclosed herein concerns a wireless terminal that participates in communications over a radio interface with an access node of a radio access network (RAN). The wireless terminal comprises processor circuitry and transmitter circuitry. In an example embodiment and mode, the processor circuitry configured to receive network information regarding the access node capability to support Safe-mode operation and may also receive information pertaining to the various levels supported. The network capability information may be received on System Information Block (e.g., MIB, SIB1, SIBx), or it can be provided to the UE on-demand where the UE can request such information directly or indirectly. The Access node Safe-mode capability information may also be communicated in a dedicated signaling between the base station (e.g., gNB or eNB) and the UE (e.g., msg-3, msg-4, RRC message, or using MAC CE). When the UE receives an indication of access node support, and in case of a determination that one or more capabilities supported by the wireless terminal is temporarily not available at the wireless terminal, the UE may decide to enter (autonomously or based on a permission from the access node) one of plural levels of restricted capability operation. The plural levels of restricted capability operation correspond to plural degrees of severity of local condition within the UE. In Network based operation, if the network supports Safe mode operation, the UE may decide to inform the network of its impending condition/situation and wait for a respond on how to act. Depending on the network response, the UE may continue to operate within a set of capability restrictions for a pre-defined period of time (configured by the network). The UE may also terminate or down-grade its current operations depending on the network directives. The UE may also power-down or time-out. When the Safe-mode condition is resolved and the UE returns to normal operation, the UE informs the network of its status. If the network does not support Safe-Mode operation, then the UE acts autonomously and triggers a downgrade, release, time-out, or other suitable action depending the level of severity.

In a UE-based Solution, the UE may decide autonomously to activate Safe-mode operation and determine the Safe-mode level, and hence, a list of restricted capabilities, Applications, Procedures, Operations. These operations/capabilities can be RAN-based capabilities (i.e., Access Stratum (AS)-based such as MIMO operation, Modulation/Coding adaptation, Carrier Aggregation, Dual Connectivity, Multi-carrier, Supplementary UL support, Band Width Part (BWP) operations, etc.). The operations/Capabilities may also include Non-Access Stratum (NAS) capabilities (Core-Network functions, procedures such as Area Updates or Periodic Updates; or applications such as IP based application, Email, IMS, Location-based Services, Supplementary Services, etc.). In such case, if the Network is capable of supporting Safe-Mode, then the UE should behave according to the previously described operations (e.g., informing, in a limited set of scenarios, the network that it is operating in a Safe-mode and indicate the Safe-mode level). The Network may accept, reject, or modify the UE configuration based on the information received. If the network does not support Safe-Mode operation, then the UE acts autonomously and triggers a downgrade, release, time-out depending the level of severity.

In yet another of its example aspects the technology disclosed herein concerns an access node of a radio access network (RAN) that communicates over a radio interface with a wireless terminal. The access node comprises receiver circuitry, processor circuitry, and transmitter circuitry. The receiver circuitry is configured to receive a safe mode indication from the wireless terminal, the safe mode indication configured to indicate to the access node that one or more capabilities supported by the wireless terminal is temporarily not available at the wireless terminal. In an example embodiment and mode the processor circuitry is configured to generate a message to the wireless terminal relating to a capability of the wireless terminal. The transmitter circuitry is configured to transmit the message over the radio interface to the wireless terminal. In still another of its example aspects the technology disclosed herein concerns methods of operating such access nodes.

In yet another of its example aspects, the technology disclosed herein concerns an access node of a radio access network (RAN) that communicates over a radio interface with a wireless terminal. The access node comprises receiver circuitry, processor circuitry, and transmitter circuitry. The receiver circuitry is configured to send an indication pertaining to network support of safe mode operation. The network (e.g., gNB or eNB) may broadcast it ability to support UEs operating in Safe-Mode using System Information or any other suitable format and/or signaling. The receiver circuitry is configured to receive a safe mode indication from the wireless terminal, the safe mode indication to indicating to the access node that one or more capabilities supported by the wireless terminal is temporarily not available at the wireless terminal. In an example embodiment and mode, the access node processor circuitry is configured to generate a message to the wireless terminal relating to a capability of the wireless terminal. The transmitter circuitry is configured to transmit the message over the radio interface to the wireless terminal. In still another of its example aspects, the technology disclosed herein concerns methods of operating such access nodes.

In yet another of its example aspects, the technology disclosed herein includes combinations of the described solutions, where the UE is operating in Network-based, Safe-mode operation and could not access the network for directives or it does not receive network directives in a reasonable time frame, in which case, the UE may revert to autonomous UE based operation. The UE may also revert back to Network-based, Safe-mode operation once conditions allow. The network may instruct a group of UEs to go into Safe mode operation without any input from the UE.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

DETAILED DESCRIPTION

Figure 1:
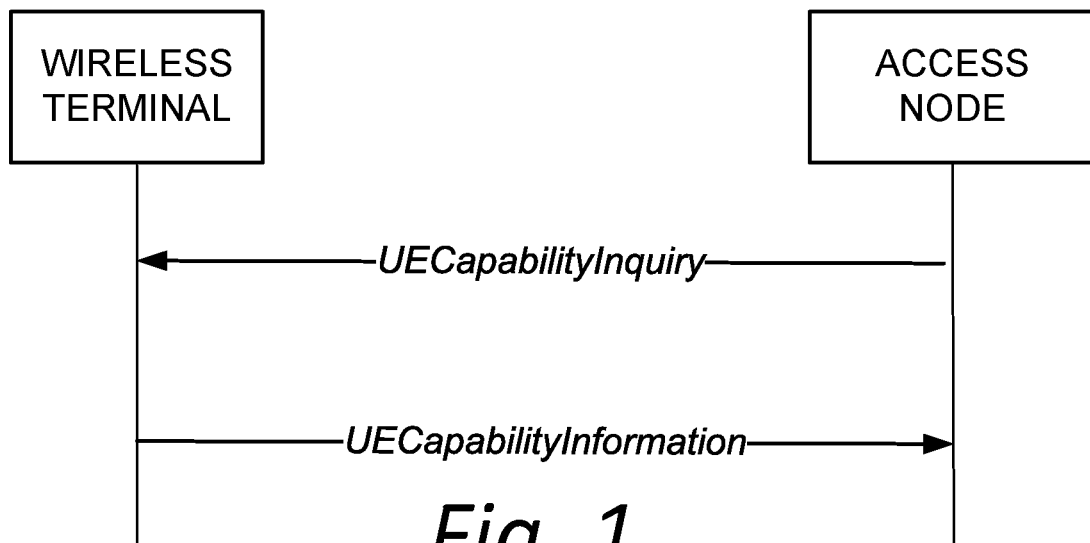
FIG. 1 is a diagrammatic view showing a procedure wherein an eNB and/or gNB may request UE to transfer a list of certain capabilities as determined by eNB/gNB.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, netbooks, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB"), a 5G (New Radio [NR]) gNodeB ("gNB"), or some other similar terminology. Another non-limiting example of a base station is an access point. An access point may be an electronic device that provides access for wireless terminal to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10, 11, 12, or higher), the scope of the present disclosure should not be limited in this regard. At least some aspects of the systems and methods disclosed herein may be utilized in other types of wireless communication systems.

As used herein, the term "telecommunication system" or "communications system" can refer to any network of devices used to transmit information. A non-limiting example of a telecommunication system is a cellular network or other wireless communication system.

As used herein, the term "cellular network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMT-Advanced"). All or a subset of the cell may be adopted by 3GPP as licensed bands (e.g., frequency band) to be used for communication between a base station, such as a Node B or gNodeB, and a UE terminal. A cellular network using licensed frequency bands can include configured cells. Configured cells can include cells of which a UE terminal is aware and in which it is allowed by a base station to transmit or receive information.

Figure 2:
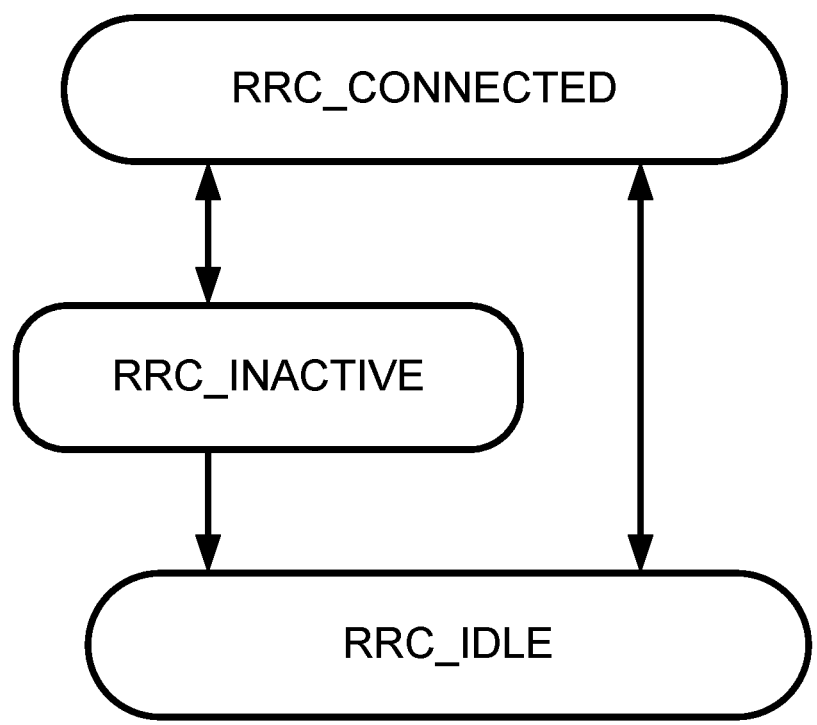
FIG. 2 is a diagrammatic view showing transition states of a Radio Resource Control RRC state machine.

As described herein, both an access node and a wireless terminal may manage respective Radio Resource Control (RRC) state machines. The RRC state machines transition between several RRC states including RRC_IDLE, RRC_INACTIVE and RRC_CONNECTED. FIG. 2 depicts the state transition diagram of the RRC states. From the vantage point of a wireless terminal e.g., user equipment (UE), the RRC states may be briefly characterized as follows:

RRC_IDLE:
  A UE specific DRX (discontinuous reception) may be configured by upper layers;
  UE controlled mobility based on network configuration;
  The UE:
    Monitors a Paging channel;
    Performs neighboring cell measurements and cell (re-) selection;
    Acquires system information.

RRC_INACTIVE:
  A UE specific DRX may be configured by upper layers or by RRC layer;
  UE controlled mobility based on network configuration;
  The UE stores the Access Stratum (AS) context;
  The UE:
    Monitors a Paging channel;
    Performs neighboring cell measurements and cell (re-) selection;
    Performs RAN-based notification area updates when moving outside the RAN-based notification area;
    Acquires system information.

RRC_CONNECTED:
  The UE stores the AS context.
  Transfer of unicast data to/from UE.
  At lower layers, the UE may be configured with a UE specific DRX;
  Network controlled mobility, i.e. handover within NR and to/from E-UTRAN;
  The UE:
    Monitors a Paging channel;
    Monitors control channels associated with the shared data channel to determine if data is scheduled for it;
    Provides channel quality and feedback information;
    Performs neighboring cell measurements and measurement reporting;
    Acquires system information.

Figure 3:
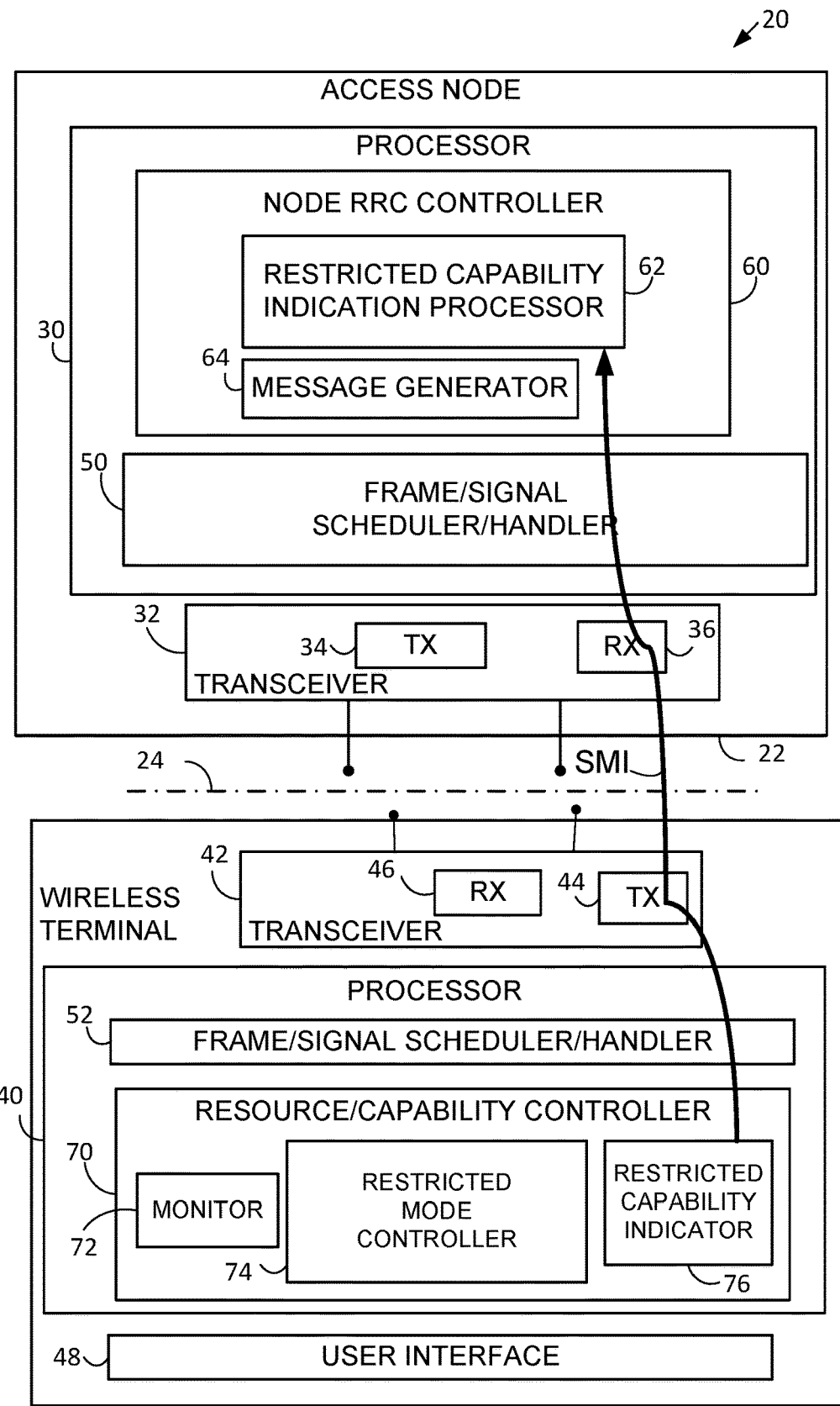
FIG. 3 is a schematic view showing an example generic communications system comprising a radio access node and a wireless terminal, wherein the wireless terminal is capable of operating in a safe mode and accordingly generating a restricted capability indication for transmission to the access node.

FIG. 3 shows an example communications system 20 wherein radio access node 22 communicates over air or radio interface 24 (e.g., Uu interface) with wireless terminal 26. As mentioned above, the radio access node 22 may be any suitable node for communicating with the wireless terminal 26, such as a base station node, or eNodeB ("eNB") or gNodeB ("gNB"), for example. The node 22 comprises node processor circuitry ("node processor 30") and node transceiver circuitry 32. The node transceiver circuitry 32 typically comprises node transmitter circuitry 34 and node receiver circuitry 36, which are also called node transmitter and node receiver, respectively.

The wireless terminal 26 comprises terminal processor 40 and terminal transceiver circuitry 42. The terminal transceiver circuitry 42 typically comprises terminal transmitter circuitry 44 and terminal receiver circuitry 46, which are also called terminal transmitter 44 and terminal receiver 46, respectively. The wireless terminal 26 also typically comprises user interface 48. The terminal user interface 48 may serve for both user input and output operations, and may comprise (for example) a screen such as a touch screen that can both display information to the user and receive information entered by the user. The user interface 48 may also include other types of devices, such as a speaker, a microphone, or a haptic feedback device, for example.

For both the radio access node 22 and radio interface 24, the respective transceiver circuitries 22 include antenna(s). The transmitter circuit 34 and transmitter circuit 44 may comprise, e.g., amplifier(s), modulation circuitry and other conventional transmission equipment. The receiver circuit 36 and receiver circuit 46 may comprise, e.g., e.g., amplifiers, demodulation circuitry, and other conventional receiver equipment.

In general operation, access node, 22 and wireless terminal 26 communicate with each other across radio interface 24 using predefined configurations of information. By way of non-limiting example, the radio access node 22 and wireless terminal 26 may communicate over radio interface 24 using "frames" of information that may be configured to include various channels. For example, a frame, which may have both downlink portion(s) and uplink portion(s), may comprise plural subframes, with each subframe in turn being divided into two slots. The frame may be conceptualized as a resource grid, e.g. a two dimensional grid, comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a subcarrier. The frame and subframe structure serves only as an example of a technique of formatting of information that is to be transmitted over a radio or air interface. It should be understood that "frame" and "subframe" may be utilized interchangeably or may include or be realized by other units of information formatting, and as such may bear other terminology (such as blocks, for example).

To cater to the transmission of information between radio access node 22 and wireless terminal 26 over radio interface 24, the node processor 30 and terminal processor 40 of FIG. 3 are shown as comprising respective information handlers. For an example implementation in which the information is communicated via frames, the information handler for radio access node 22 is shown as node frame/signal scheduler/handler 50, while the information handler for wireless terminal 26 is shown as terminal frame/signal handler 52.

In one of its example aspects, the technology disclosed herein concerns, e.g., apparatus, methods, and procedures for a wireless terminal to autonomously declare a Safe Mode, e.g., a mode in which one or more capabilities supported by the wireless terminal is temporarily not available, e.g. not available for allocation and/or configuration, at the wireless terminal. Further, the wireless terminal may provide an indication of such safe mode, e.g., a safe mode indication or restricted capability indication, to an access node. Since in at least some of the example embodiments and modes the technology disclosed herein involves the Radio Resource Control (RRC) procedures, FIG. 3 shows node processor 30 as comprising node radio resource control (RRC) controller 60, e.g., node RRC controller 60. The node RRC controller 60 may execute an instance of the RRC state machine for each wireless terminal in which the access node 20 is in communication, with each instance keeping track of the RRC state transitions experienced by the wireless terminal associated with the respective instance. The node RRC controller 60 is further shown in FIG. 3 as comprising restricted capability indicator processor 62 and RRC message generator 64.

FIG. 3 also shows the terminal processor 40 of wireless terminal 26 as comprising a terminal RRC controller, also known as terminal resource/capability controller 70. The terminal RRC controller 70 includes or executes the RRC state machine discussed above, which transitions through the RRC states, as described above and shown in FIG. 2, for a communication involving wireless terminal 26. In an example embodiment and mode, terminal resource/capability controller 70 comprises terminal monitor 72, restricted mode controller 74, and restricted capability indicator 76.

The terminal monitor 72 determines whether the wireless terminal 26 should operate in a "normal mode" or in a "safe mode". If the terminal monitor 72 determines that a certain capability is supported by the wireless terminal 26 but is unavailable or should be temporary unavailable, e.g., unavailable for allocation/configuration for new services, the terminal monitor 72 changes the mode of wireless terminal 26 from "normal mode" to "safe mode". In accordance with one non-limiting, example aspect of the technology disclosed herein, such declaration of safe mode and/or changing of operational mode of the wireless terminal to a safe mode may be performed autonomously, e.g., without network approval. As used herein, "safe mode" and "restricted mode" have the same meaning, and are used interchangeably. The terminal monitor 72 may determine that the certain capability is or should be temporary unavailable for several reasons, such as, by way of non-limiting example: the requested resources/capability are utilized by other applications; the wireless terminal is overloaded, e.g., processor resources of the wireless terminal 26 are overloaded; a maximum number of processes performed by the wireless terminal 26 is reached or exceeded; overheating of the wireless terminal 26; memory issues, high RF interference, security issues, programs or application errors, reboot issues, or any other issues involving the wireless terminal 26 affecting extent or quality of services requested. Thus, the terminal monitor 72 determines whether the wireless terminal 26 is or should be in an exceptional processing mode, e.g., the safe mode, in which the wireless terminal 26 is exposed to the possibility of server operation and/or operational mal-function, server processing overloading which may lead to freezing or stoppage of processes, server overheating which can cause fire or battery explosions, terminal in-ability to respond to user input or network directives, or cannot or should not establish any additional RRC connections with the network.

Figure 4A:
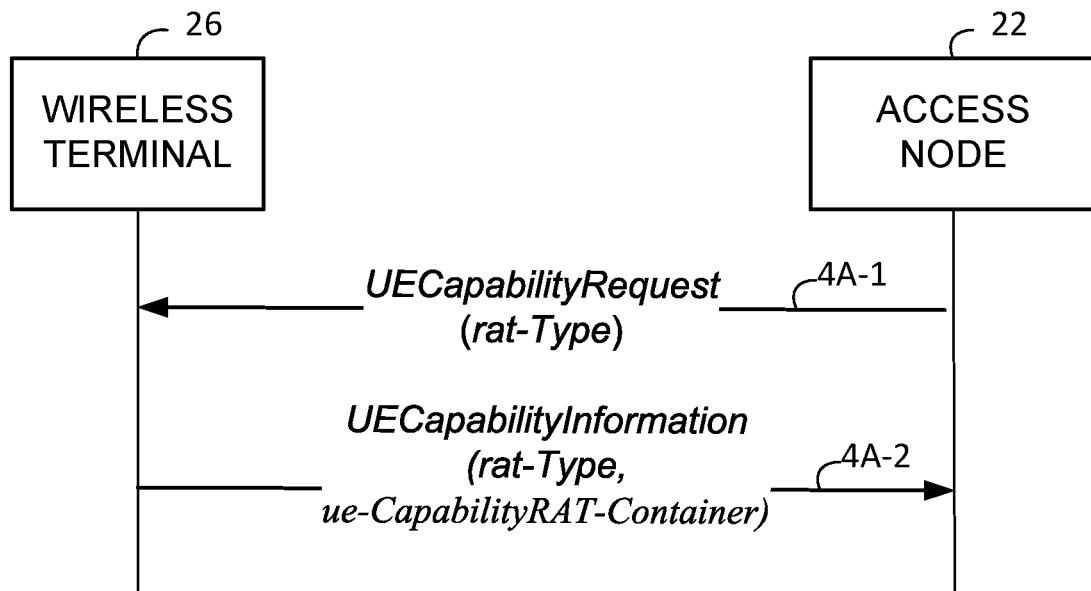
FIG. 4A is a diagrammatic views showing a procedure wherein a safe mode is not entered.
Figure 4B:
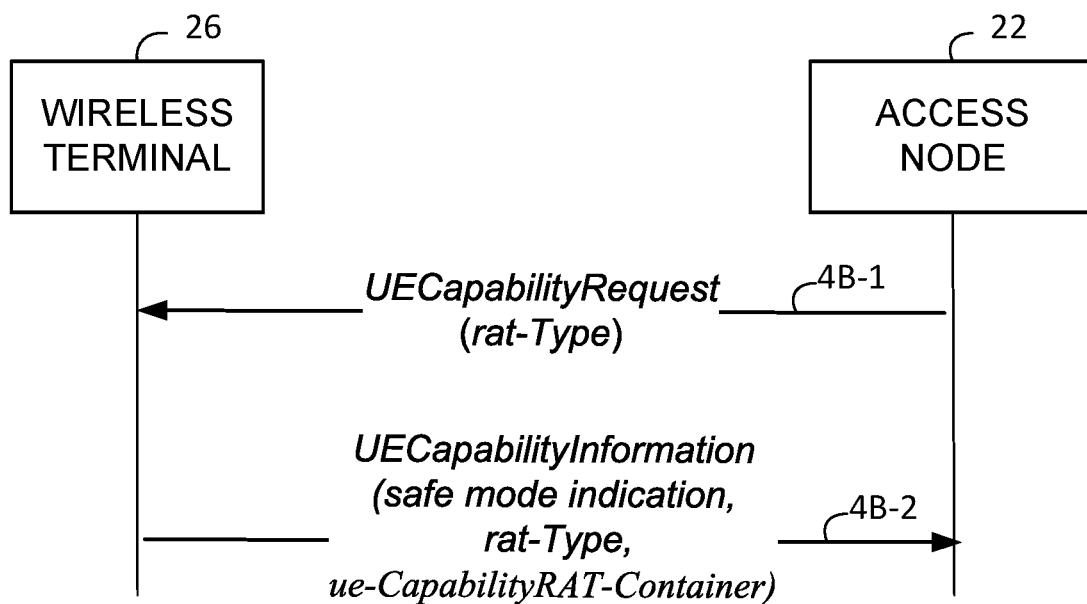
FIG. 4B is a diagrammatic views showing a procedure wherein a safe mode is entered and a restricted mode indication, also known as a restricted capability indication, is generated and transmitted.

In an embodiment and mode shown in FIG. 4A and FIG. 4B, a UECapabilityRequest message 4A-1/4B-1 (similar to the UECapabilityInquiry message of FIG. 1) generated by access node 22 may include an indication of the applicable radio access technology type for the network, e.g., rat-Type. The wireless terminal 26 may generate a UECapabilityInformation message 4A-2 as shown in FIG. 4A if three conditions are satisfied: (1) the UECapabilityRequest message does include an indication of the applicable radio access technology type, (2) the wireless terminal 26 supports the indicated applicable radio access technology type, (3) the wireless terminal 26 is operating in the "normal mode", as opposed to the "safe mode". The UECapabilityInformation message 4A-2 of FIG. 4A may include an information element indicating the supported radio access technology type (rat-Type), a listing of available capabilities of the wireless terminal 26 for the supported radio access technology type, and other information. For example, the listing of available capabilities of the wireless terminal 26 may be included in a "container", shown as ue-CapabilityRAT-Container in FIG. 4A and FIG. 4B.

On the other hand, FIG. 4B shows a situation in which, although the wireless terminal 26 supports the radio access technology type indicated in UECapabilityRequest message 4B-1, the terminal monitor 72 has determined, e.g., autonomously determined, that the wireless terminal 26 should operate in the safe mode, e.g., has determined that the wireless terminal 26 is or should be in an exceptional processing mode. In such situation, the terminal monitor 72 has initiated operation of restricted mode controller 74 to enter the "safe mode". Further, the restricted mode controller 74 causes restricted capability indicator 76 to generate UECapabilityInformation message 4B-2 of FIG. 4B. Like the UECapabilityInformation message 4A-2 of FIG. 4A, the UECapabilityInformation message 4B-2 of FIG. 4B may include an information element indicating the supported radio access technology type (rat-Type) and a listing of available capabilities of the wireless terminal 26 for the supported radio access technology type (in a container such as ue-CapabilityRAT-Container). But the UECapabilityInformation message 4B-2 of FIG. 4B further includes a restricted capability indication. The restricted capability indication is also referred to herein as the safe mode indication, and the terms are used interchangeably. Such restricted capability indication or safe mode indication is also shown as arrow SMI in FIG. 3. The restricted capability indication/safe mode indication is configured to indicate to the access node that one or more capabilities supported by the wireless terminal is temporarily not available at the wireless terminal.

As described herein, the restricted capability indication may be an information element of a message and may take the form of a flag, a binary field, or a multi-bit/multi-value field.

Figure 5:
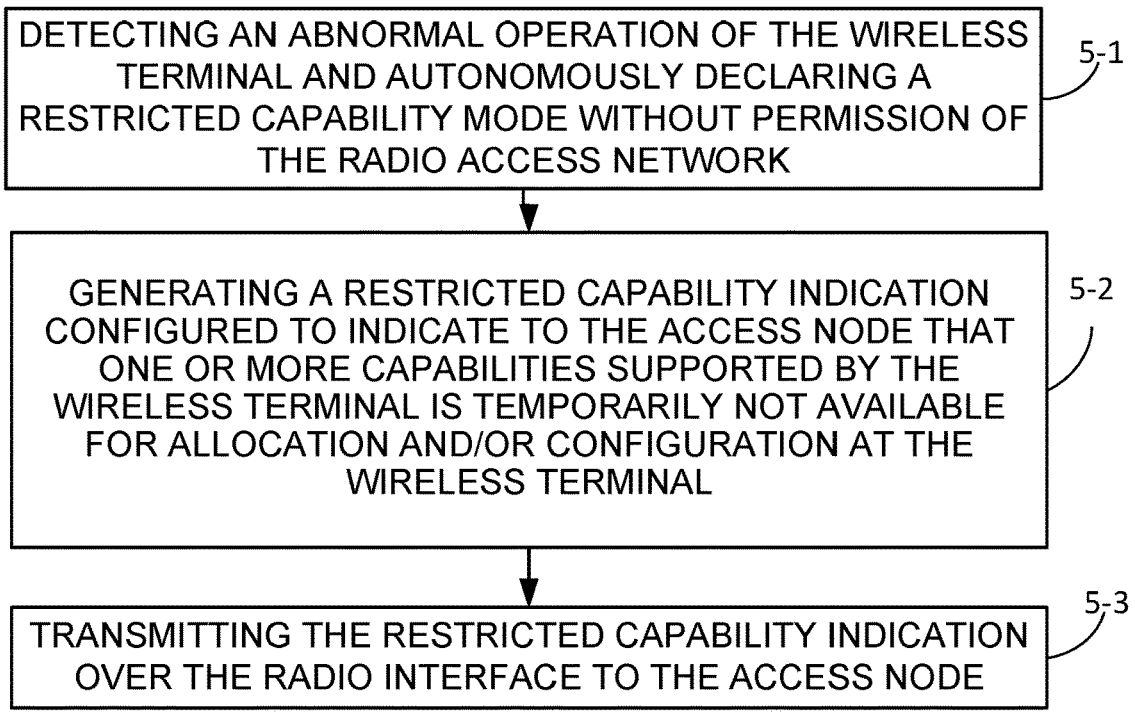
FIG. 5 is a flowchart showing example, non-limiting, representative acts or steps that may be performed by a wireless terminal of FIG. 3 in a safe mode.

FIG. 5 shows example, non-limiting, representative acts or steps that may be performed by wireless terminal 26 of FIG. 3, and particularly by terminal resource/capability controller 70 of wireless terminal 26. Act 5-1 comprises detecting an abnormal operation of the wireless terminal and autonomously determining/declaring a restricted capability mode without permission of the radio access network. Act 5-1 may be performed by, e.g., terminal monitor 72. Act 5-2 and act 5-3 are optional acts that may logically follow act 5-1. Act 5-2 comprises generating a restricted capability indication configured to indicate to the access node that one or more capabilities supported by the wireless terminal is temporarily not available, e.g., not available for allocation and/or configuration, at the wireless terminal. Act 5-2 may be performed by restricted capability indicator 76, in dependence upon a determination made by terminal monitor 72. Act 5-3 comprises transmitting the restricted capability indication over the radio interface to the access node. Act 5-3 is performed by transmitter circuitry 44 of wireless terminal 26, with the UECapabilityInformation message being submitted to lower layers for transmission.

Once the access node 22, e.g., the EUTRAN/gNB, receives a safe mode indication, e.g., the restricted capability indication, the access node 22 triggers storage of currently available UE capabilities. If needed, the access node 22 may perform RRC Reconfiguration procedures based on the received list of currently available UE capabilities. The storage of the currently available UE capabilities may be supervised by restricted capability indicator processor 62, which may also initiate and/or perform RRC Reconfiguration procedures based on the received list of currently available UE capabilities. Any messages in conjunction with the UE capabilities may be generated by RRC message generator 64.

Figure 6:
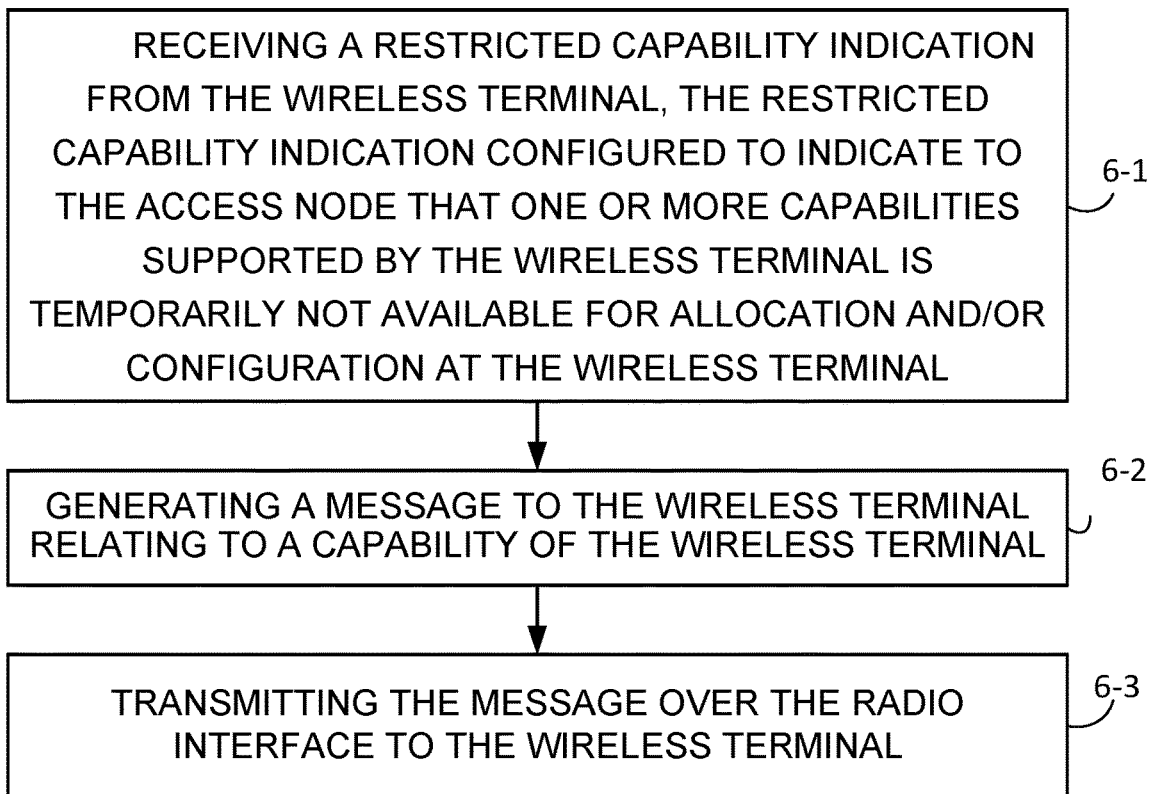
FIG. 6 is a flowchart showing representative, non-limiting example acts or steps that may be performed by an access node of FIG. 3 in conjunction with receipt and/or processing of a restricted capability indication.

FIG. 6 shows representative, non-limiting example acts or steps that may be performed by access node 22, and particularly by node RRC controller 60 in conjunction with receipt and/or processing of a restricted capability indication. Act 6-1 comprises receiving a restricted capability indication from the wireless terminal, the restricted capability indication configured to indicate to the access node that one or more capabilities supported by the wireless terminal is temporarily not available at the wireless terminal. Notably, the restricted capability indication may have been generated by wireless terminal 26 autonomously, e.g., with approval or permission of access node 22. Act 6-2 comprises generating a message to the wireless terminal relating to a capability of the wireless terminal. Act 6-3 comprises transmitting the message over the radio interface to the wireless terminal.

When the formerly restricted resource(s) again become(s) available and/or the UE transitions back into the normal mode of operation, the wireless terminal 26 shall update the access node 22, e.g., EUTRAN/gNB, with the transition using an existing RRC message. The access node 22 may them perform a new UE Capability Transfer procedure.

The structure of the wireless terminal 26 and access node 22 and operation thereof as described in any embodiment herein may be configured for any desired radio access technology type. Example, non-limiting radio access technology types include "eutra", e.g., Long Term Evolution (LTE); "cdma2000"; and 5G, e.g., New Radio (NR), as well as others mentioned and/or listed in 3GPP TS 36.331. If, for example, the UECapabilityRequest messages 4A-1/4B-1 included an indication of radio access technology type as being eutra, the UECapabilityInformation messages 4A-2/4B-2 may include a UE-EUTRA-Capability information element within a ue-CapabilityRAT-Container and includes the rat-Type as being set to eutra. Moreover it the wireless terminal 26 supports FDD and TDD, the UECapabilityInformation messages 4A-2/4B-2 may include field tdd-Add-UE-EUTRA-Capabilities and set it to include appropriate fields. As another example, if the UECapabdityRequest messages 4A-1/4B-1 included an indication of radio access technology type as being cdma2000-1×RTT, the UECapabdityInformation messages 4A-2/4B-2 may include UE radio access capabilities for CDMA2000 within a ue-CapabdityRAT-Container and set the rat-Type to cdma2000-1×RTT. As a further example, if the UECapabilityRequest messages 4A-1/4B-1 included an indication of radio access technology type as being "nr", e.g., New Radio, the UECapabilityInformation messages 4A-2/4B-2 may include UE radio access capabilities for New Radio within a ue-CapabilityRAT-Container and set the rat-Type to "nr", and in accordance with requestedFreqBandsNR-MRDC and as specified in TS 38.331. The requestedFreqBandsNR-MRDC is an existing condition in case of Multiple Radio-Dual Connectivity (MR-DC), and is an example of a capability that can be disabled as result of Safe-Mode operation.

Figure 7A:
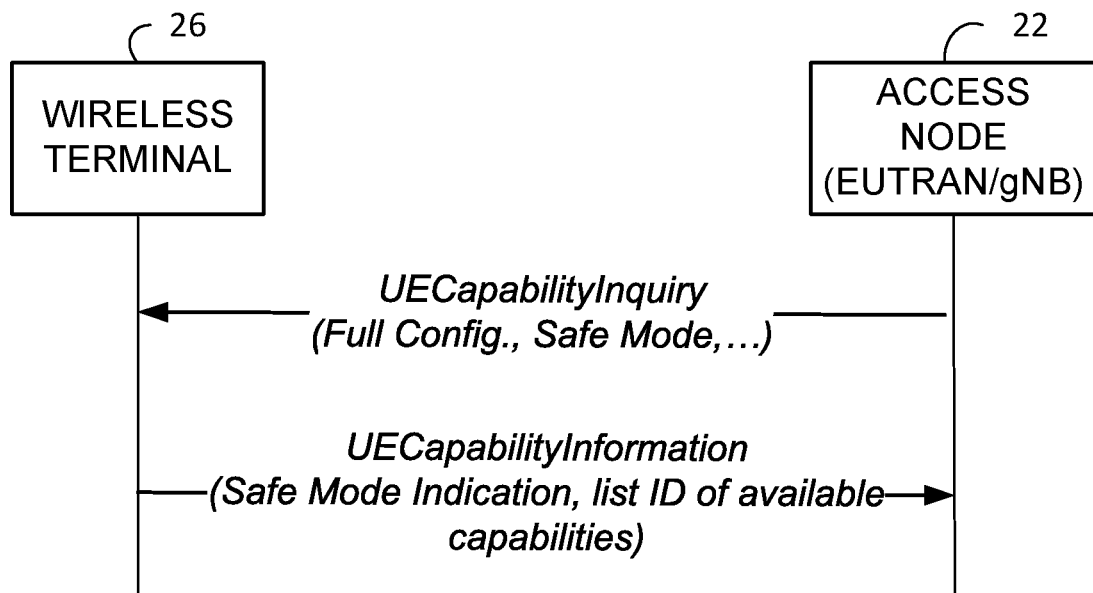
FIG. 7A-FIG. 7K are diagrammatic views showing various differing procedures wherein a safe mode is entered and a restricted capability indication may be generated and transmitted.

FIG. 4B shows that a restricted capability indication, also known as a safe mode indication, may be generated for inclusion in a UECapabilityInformation message such as UECapabilityInformation message 4B-2. Similarly, FIG. 7A shows the restricted capability indication as being included as an information element in a UECapabilityInformation message of a UE capability transfer procedure. In other example modes and embodiments, upon terminal monitor 72 having determined that the restricted mode controller 74 should be invoked, the restricted capability indicator 76 may generate the restricted capability indication/safe mode indication in other situations as well, as explained below with reference to the non-limiting examples of FIG. 7B-FIG. 7K. The safe mode indication SMI of FIG. 3 thus may be understood to refer to or represented the restricted capability indication/safe mode indication of any of the situations of FIG. 7B-FIG. 7K. In the non-limiting examples of FIG. 7B-FIG. 7K the wireless terminal 26 may and preferably has autonomously made/declared the safe mode determination. In at least some scenarios the message which carries the restricted capability indication may also include a listing of available capabilities of the wireless terminal.

Figure 7B:
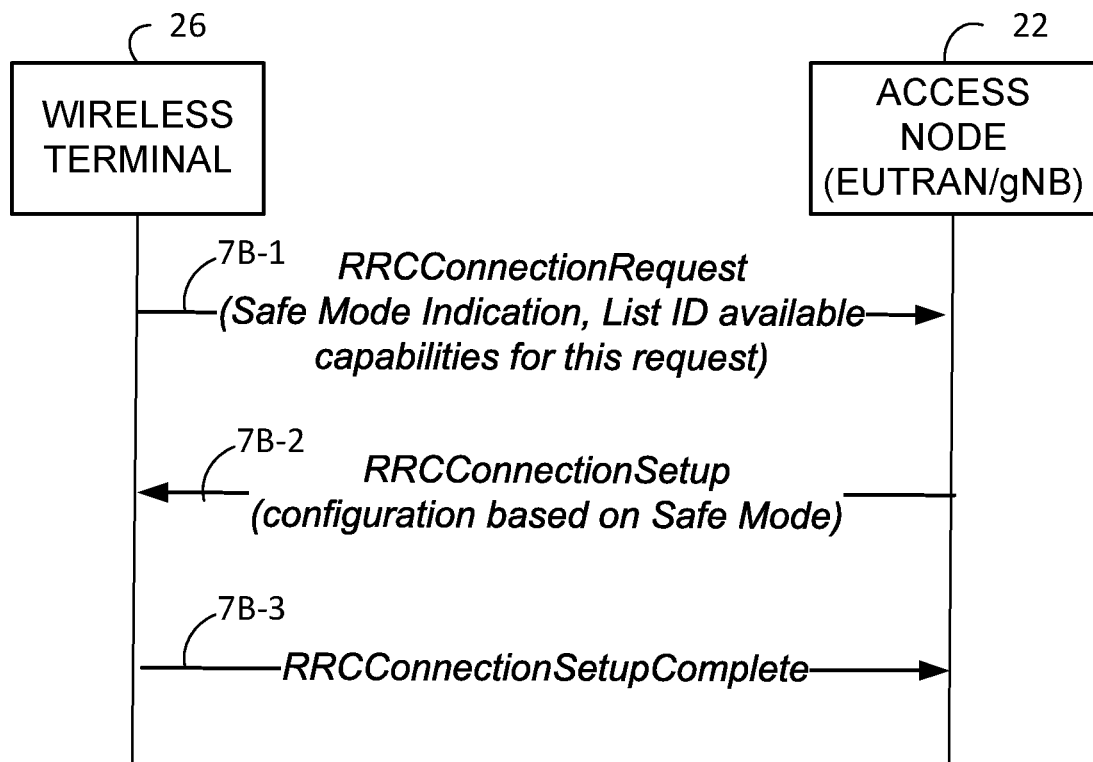

FIG. 7B shows a situation in which terminal resource/capability controller 70 generates the restricted capability indication to be included as an information element in RRCConnectionRequest message 7B-1 of a RRC connection establishment procedure. In sending the RRCConnectionRequest message 7B-1, the wireless terminal 26 may desire to set up a new service, but indicates that the wireless terminal 26 is in safe mode and provides a listing of the capabilities of the wireless terminal 26. The access node 22 may respond to the RRCConnectionRequest message 7B-1 with RRCConnectionSetup message 7B-2 in which the access node 22 supplies configuration information for the wireless terminal 26 for the safe mode. The access node 22 may prepare the configuration information for the wireless terminal 26 in view of the indicated safe mode capabilities of wireless terminal 26. The wireless terminal 26 then may respond with RRCConnectionComplete message 7B-3.

Figure 7C:
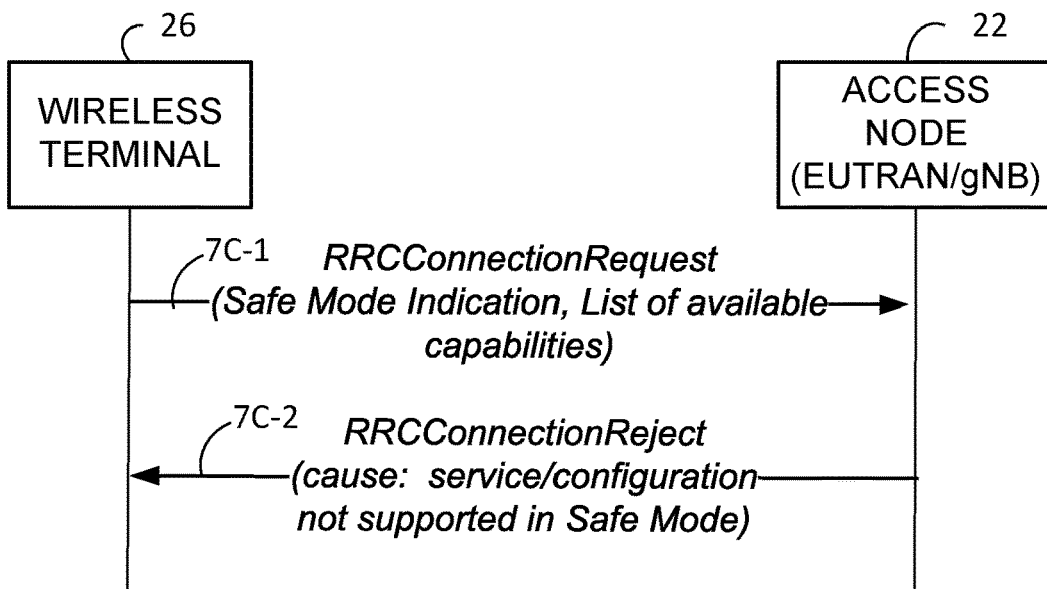

FIG. 7C also shows a situation in which terminal resource/capability controller 70 generates the restricted capability indication to be included as an information element in RRCConnectionRequest message, e.g., message 7C-1, of a RRC connection establishment procedure, again possibly for the purpose of setting up a new service. In the situation of FIG. 7C, however, the access node 22, and node RRC controller 60 in particular, generates and sends RRCConnectionReject message 7C-2 which indicates that the requested connection/service is rejected. Preferably RRCConnectionReject message 7C-2 provides to wireless terminal 26 a reason/cause for the rejection. For example, the service requested by wireless terminal 26 may not be supported when 26 may not be supported when wireless terminal 26 is in safe mode.

Figure 7D:
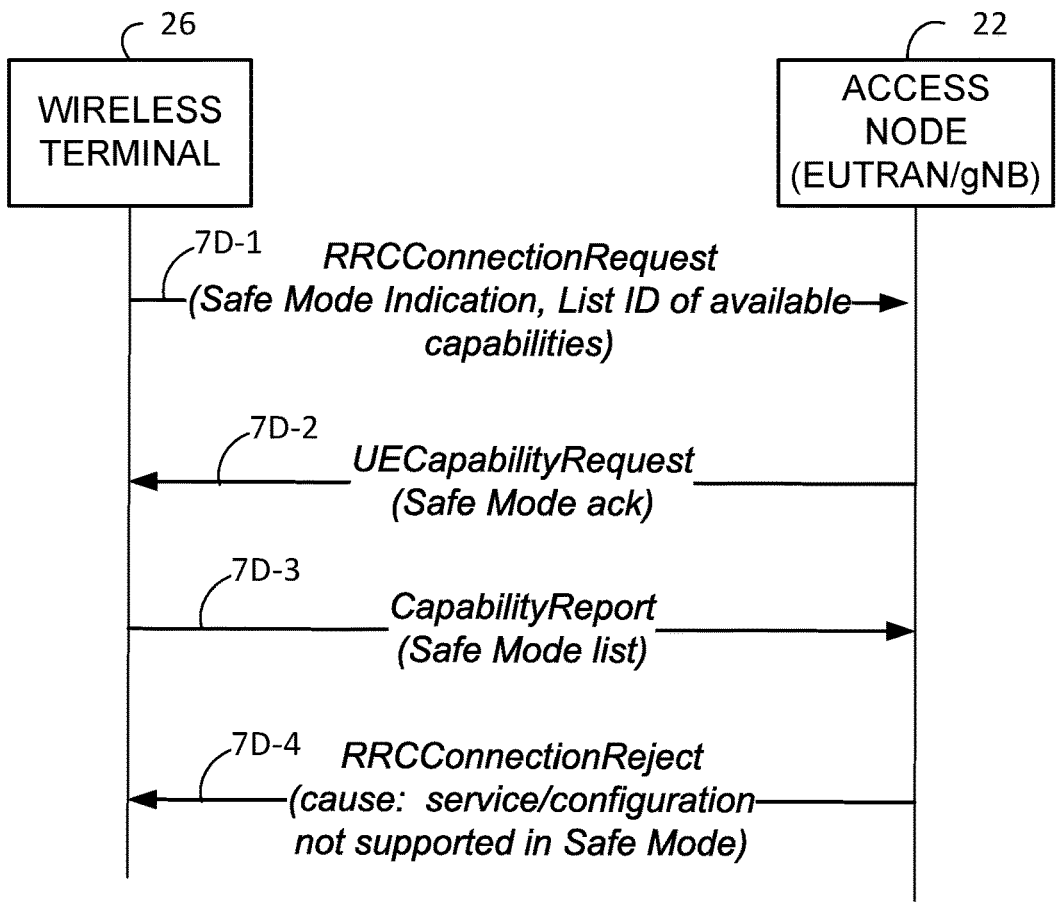

Like FIG. 7B and FIG. 7C, FIG. 7D also shows a situation in which terminal resource/capability controller 70 generates the restricted capability indication to be included as an information element in RRCConnectionRequest message, e.g., message 7D-1, of a RRC connection establishment procedure, again possibly for the purpose of setting up a new service. Although the RRCConnectionRequest message 7D-1 indicates that the wireless terminal 26 is in safe mode and preferably provides a listing of at least some of the capabilities of the wireless terminal 26, access node 22 may not have enough information to respond to the RRCConnectionRequest message 7D-1, e.g., access node 22 may need more information about the capabilities of wireless terminal 26. Accordingly, access node 22 sends UECapabilitiesRequest message 7D-2 to wireless terminal 26. The UECapabilitiesRequest message 7D-2 may acknowledge the fact that wireless terminal 26 is in safe mode, but may nevertheless request more specific or more particularized capability information from wireless terminal 26. FIG. 7D further shows wireless terminal 26 as responding to the UECapabilitiesRequest message 7D-2 with CapabilitiesReport message 7D-3, which includes the sought listing of safe mode capabilities for wireless terminal 26. The CapabilitiesReport message 7D-3 is thus an example of another message wherein the wireless terminal 26 provides a listing of further available capabilities of the wireless terminal when requested for the further listing by the access node. As it turns out, in the situation of FIG. 7D the access node 22 nevertheless determines, on the basis of the capabilities provided by wireless terminal 26, that the connection cannot be supported. Accordingly, the access node 22 sends RRCConnectionReject message 7D-4 which indicates that the requested connection/service is rejected. Preferably RRCConnectionReject message 7D-4 provides to wireless terminal 26 a reason/cause for the rejection.

Figure 7E:
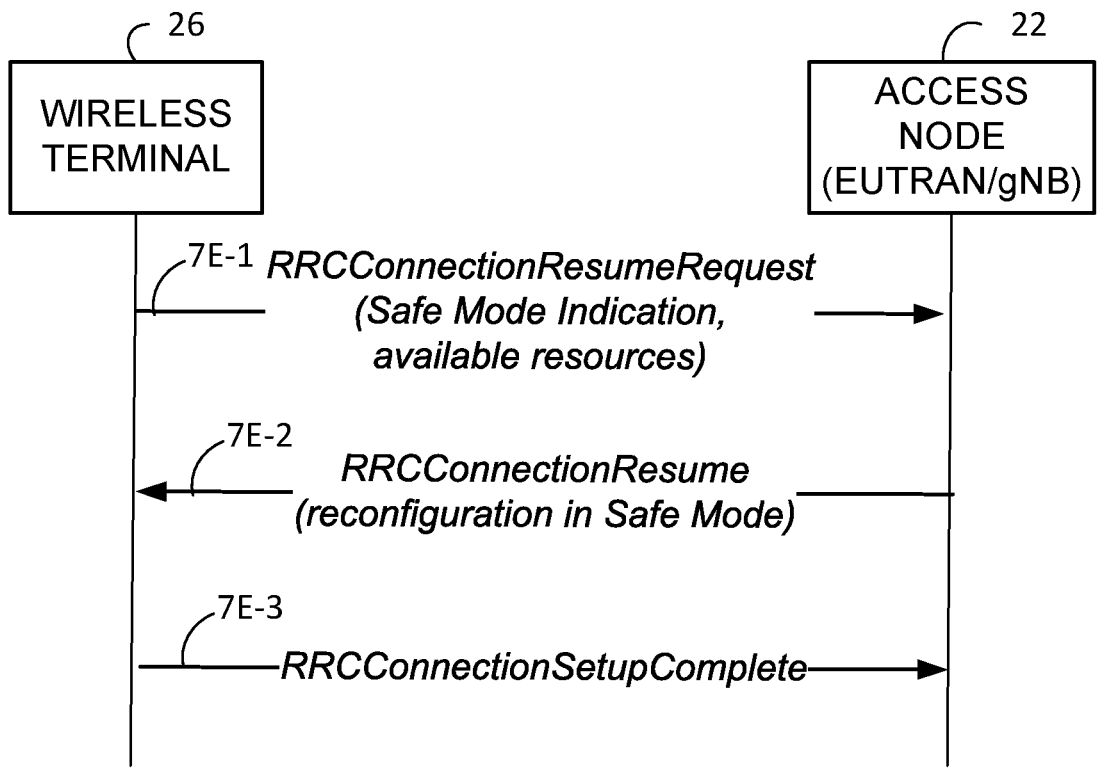

FIG. 7E shows a situation in which terminal resource/capability controller 70 generates the restricted capability indication to be included as an information element in RRCConnectionResumeRequest message 7E-1 of a RRC connection resume procedure. In sending the RRCConnectionResumeRequest message 7E-1, the wireless terminal 26 may desire to resume a particular service, and indicates that the wireless terminal 26 is now in safe mode and provides a listing of the capabilities of the wireless terminal 26. The access node 22 may respond to the RRCConnectionResumeRequest message 7E-1 with RRCConnectionResume message 7E-2 in which the access node 22 supplies configuration information for the wireless terminal 26 for the safe mode. The access node 22 may prepare the configuration information for resumption of the connection the wireless terminal 26 in view of the indicated safe mode capabilities of wireless terminal 26. For example, receiver circuitry 46 may receive reconfiguration information for a restricted mode of operation for the wireless terminal, and terminal resource/capability controller 70 utilizes the reconfiguration information for reconfiguring operation of the wireless terminal. The wireless terminal 26 then may respond with RRCConnectionComplete message 7E-3.

Figure 7F:
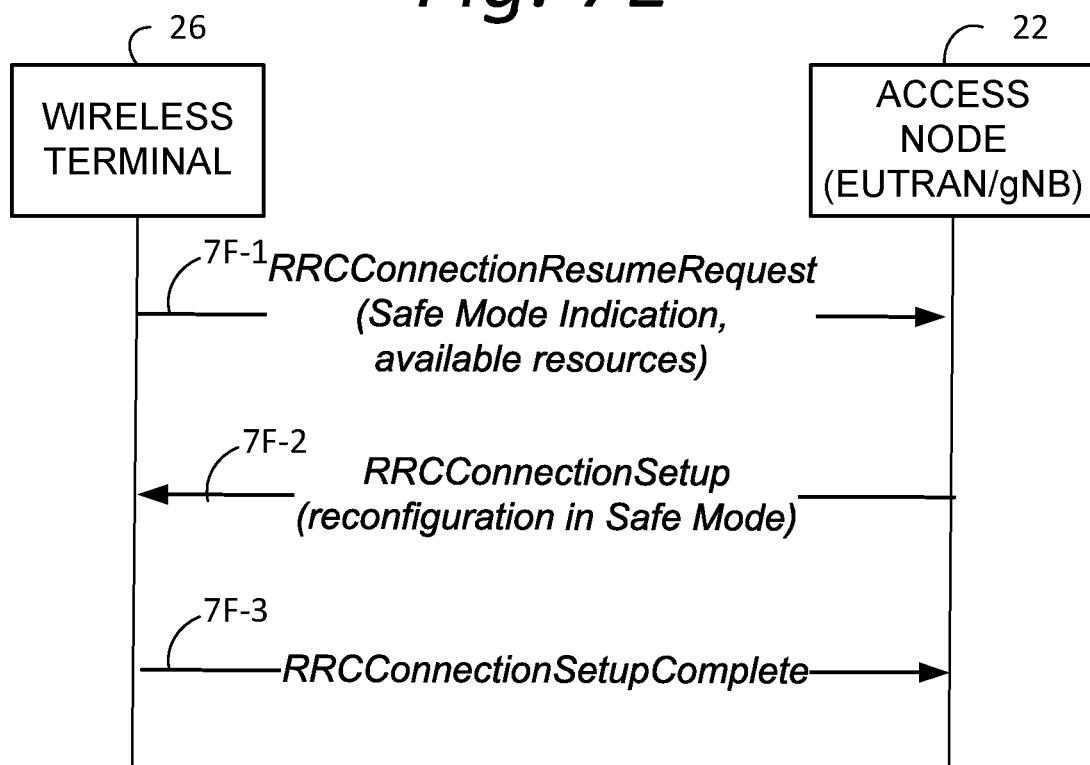

FIG. 7F also shows a situation in which terminal resource/capability controller 70 generates the restricted capability indication to be included as an information element in RRCConnectionResumeRequest message 7F-1 of a RRC connection resume procedure. In sending the RRCConnectionResumeRequest message 7F-1, the wireless terminal 26 may again desire to resume a particular service, and indicates that the wireless terminal 26 is now in safe mode and provides a listing of the capabilities of the wireless terminal 26. Unlike the situation of FIG. 7E, in the situation of FIG. 7F the access node 22 may respond to the RRCConnectionResumeRequest message 7F-1 with RRCConnectionSetup message 7F-2 in which the access node 22 supplies configuration information for a new connection with the wireless terminal 26 for the safe mode, e.g., a reconfiguration in safe mode. The access node 22 may prepare the configuration information for the new connection to the wireless terminal 26 in view of the indicated safe mode capabilities of wireless terminal 26. The wireless terminal 26 then may respond with RRCConnectionComplete message 7F-3.

Figure 7G:
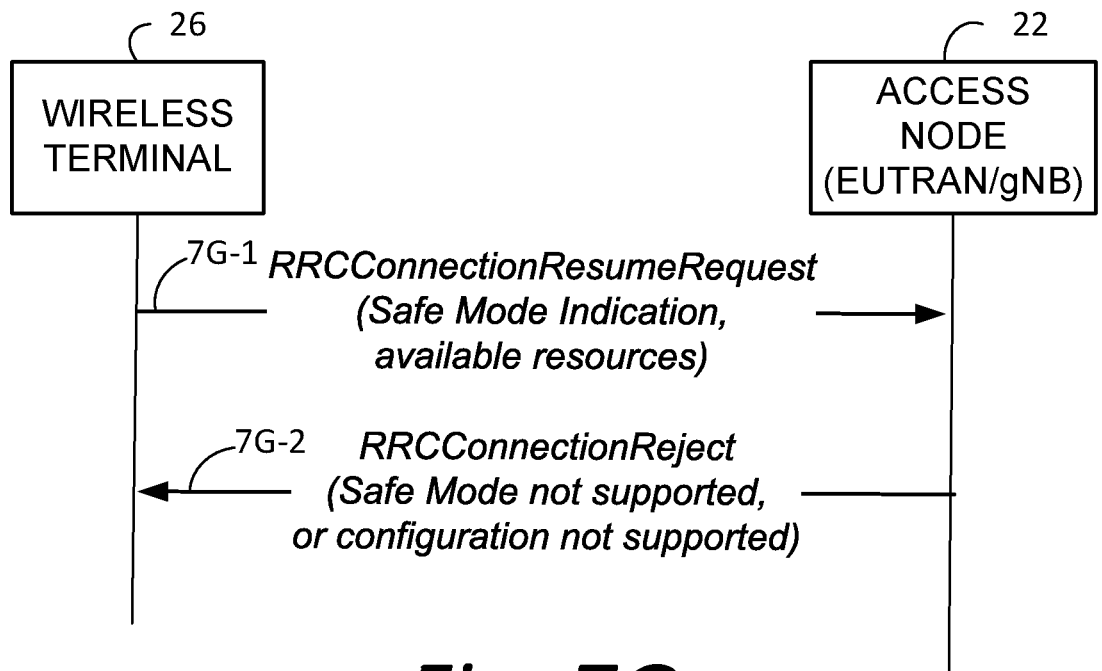

FIG. 7G also shows a situation in which terminal resource/capability controller 70 generates the restricted capability indication to be included as an information element in RRCConnectionResumeRequest message 7G-1 of a RRC connection resume procedure. The RRCConnectionResumeRequest message 7G-1 indicates that the wireless terminal 26 is now in safe mode and provides a listing of the capabilities of the wireless terminal 26. But in the situation shown in FIG. 7G the access node 22 responds to the RRCConnectionResumeRequest message 7G-1 with RRC-ConnectionReject message 7G-2. The RRCConnectionReject message 7G-2 may be generated for various reasons, such as the access node 22 not supporting the safe mode operation of wireless terminal 26, or a configuration for the safe mode itself not being supported.

Figure 7H:
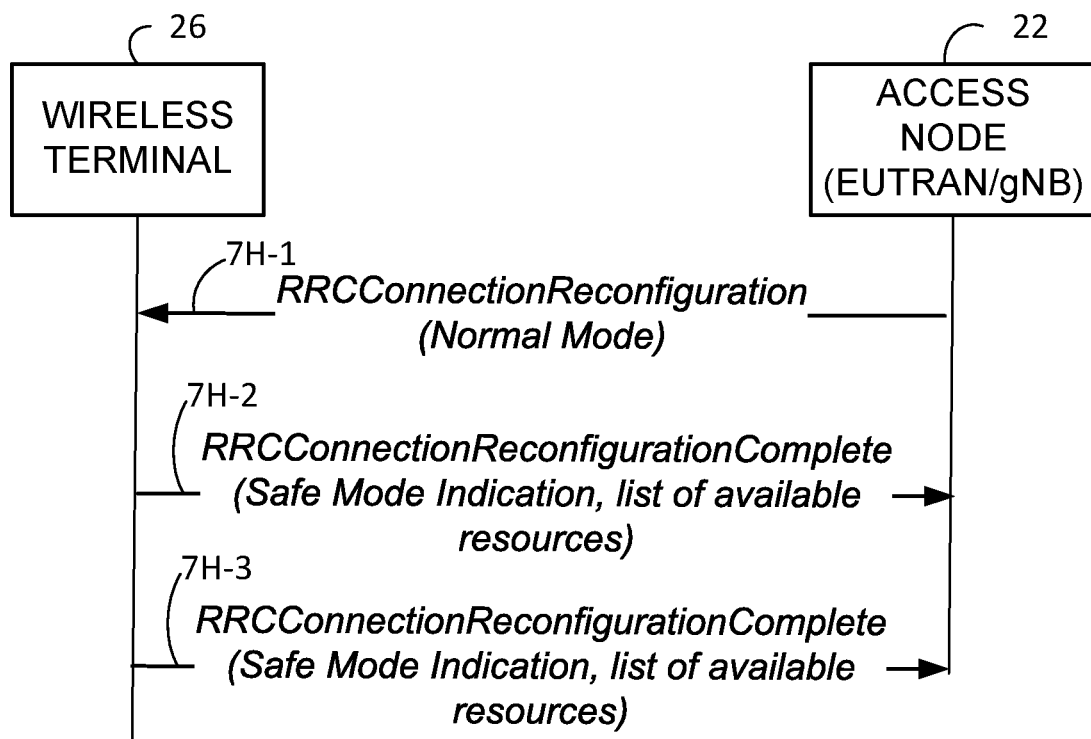

FIG. 7H shows a situation in which access node 22 request reconfiguration for an existing connection or service between access node 22 and wireless terminal 26. The access node 22 request reconfiguration using RRCConnectionReconfiguration message 7H-1 of a RRC connection reconfiguration procedure. In sending RRCConnectionReconfiguration message 7H-1, the access node 22 assumes that wireless terminal 26 is in normal mode. But upon receipt of RRCConnectionReconfiguration message 7H-1, or shortly thereafter, the wireless terminal 26 is not in normal mode, but instead has transitioned to safe mode. Therefore, wireless terminal 26 sends RRCConnectionReconfigurationComplete message 7H-2 which indicates that the wireless terminal 26 is now in safe mode and provides a listing of the available resources of the wireless terminal 26. Thereafter, access node 22 sends a message to wireless terminal 26, indicating whether access node 22 agrees with or rejects the reconfiguration based on the available resources of the wireless terminal 26.

Figure 7I:
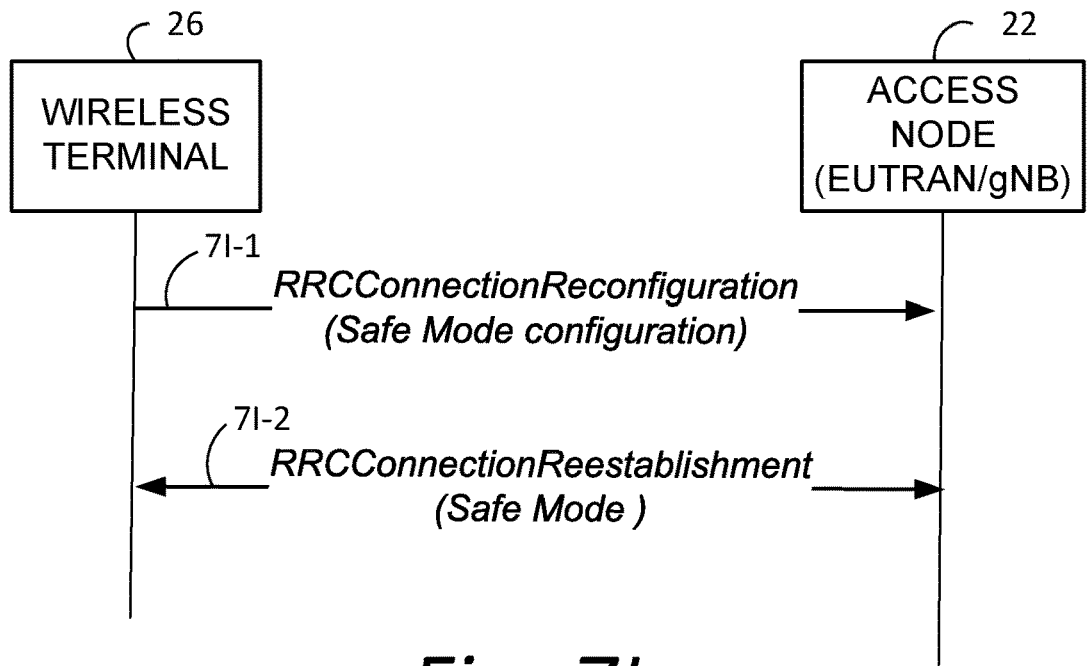

FIG. 7I shows a reconfiguration situation in which wireless terminal 26 requests reconfiguration for an existing connection or service between access node 22 and wireless terminal 26. The wireless terminal 26 request reconfiguration using RRCConnectionReconfiguration message 7I-1 of a RRC connection reconfiguration procedure. In sending RRCConnectionReconfiguration message 7I-1, wireless terminal 26 requests reconfiguration of an existing service or connection, but indicates that the wireless terminal 26 is now in safe mode and provides a listing of the available resources of the wireless terminal 26. Upon receipt of RRCConnectionReconfiguration message 7I-1 the access node 22 determines whether access node 22 agrees with and can support the reconfiguration request, and if such determination is affirmative sends RRCConnectionReestablishment message 7I-2. The RRCConnectionReestablishment message 7I-2 preferably includes an information element which acknowledges the safe mode operation of wireless terminal 26.

Figure 7J:
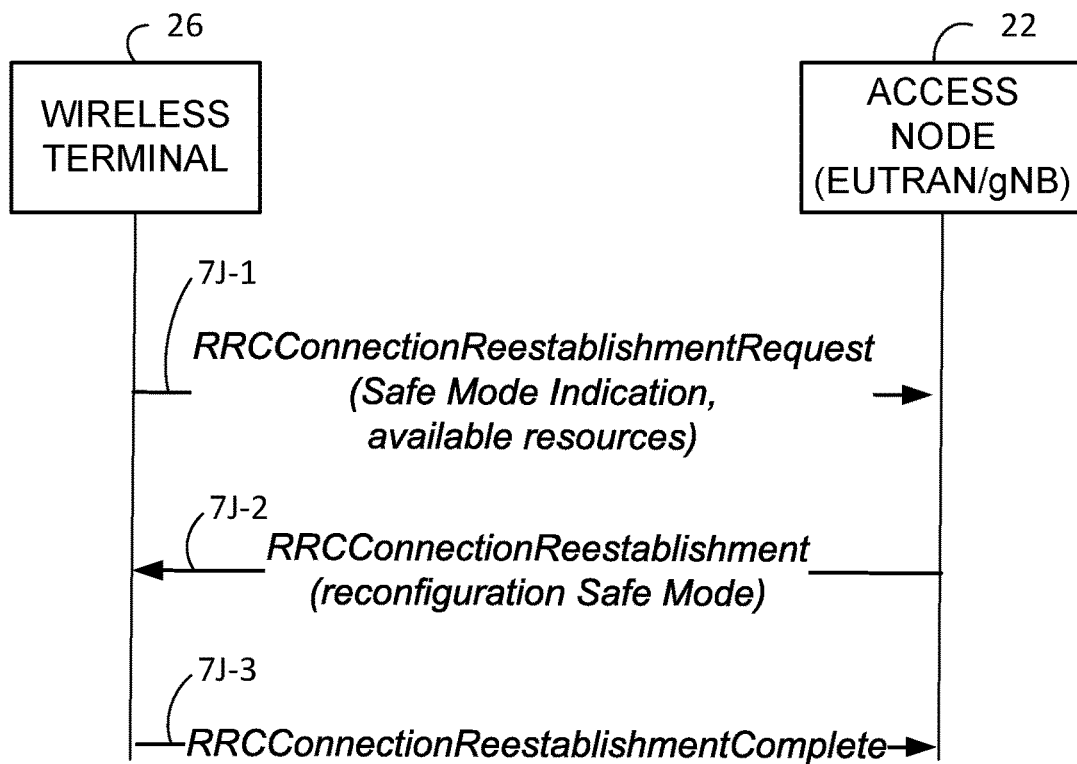

FIG. 7J shows a situation in which wireless terminal 26 may request reestablishment of a connection between access node 22 and wireless terminal 26. The wireless terminal 26 requests reestablishment of the connection using RRCConnectionReestablishmentRequest message 7J-1 of a RRC connection re-establishment procedure. In particular, terminal resource/capability controller 70 may generate the restricted capability indication to be included as an information element in RRCConnectionReestablishmentRequest message 7J-1. In sending the RRCConnectionReestablishmentRequest message 7J-1, the wireless terminal 26 indicates that the wireless terminal 26 is in safe mode and provides a listing of the capabilities of the wireless terminal 26. The access node 22 may respond to the RRCConnectionReestablishmentRequest message 7J-1 with RRCConnectionReestablishment message 7J-2 in which the access node 22 supplies configuration information for the reestablishment of the connection with the wireless terminal 26 for the safe mode. The access node 22 may prepare the configuration information for the wireless terminal 26 in view of the indicated safe mode capabilities of wireless terminal 26. The wireless terminal 26 then may respond with RRCReestablishmentComplete message 7J-3.

Figure 7K:
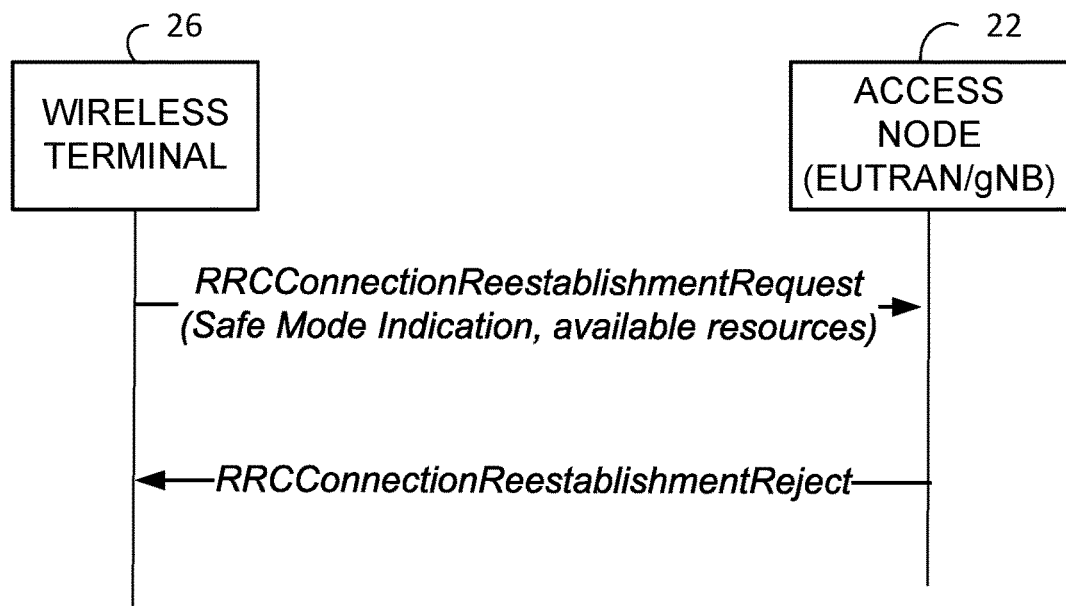
Figure 16:
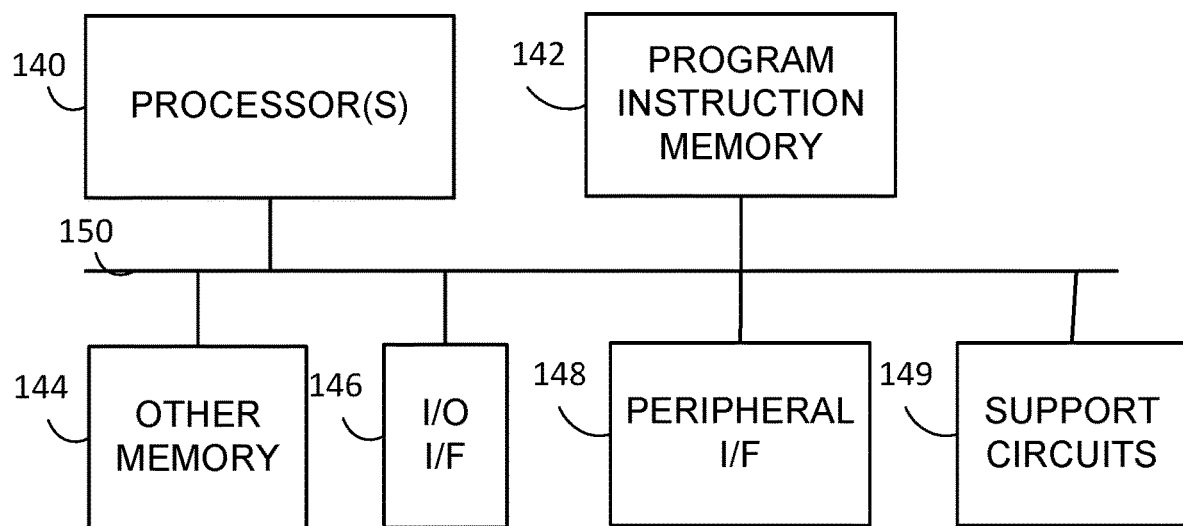
FIG. 16 is a diagrammatic view showing example electronic machinery which may comprise node electronic machinery or terminal electronic machinery.

FIG. 7K also shows a situation in which wireless terminal 26 may request reestablishment of a connection between access node 22 and wireless terminal 26. The wireless terminal 26 request reestablishment of the connection using RRCConnectionReestablishmentRequest message 7K-1 of a RRC connection re-establishment procedure. But in the situation of FIG. 7K, the access node 22 rejects the RRCConnectionReestablishmentRequest message 7K-1 in sending RRCConnectionReestablishmentReject message 7K-2.

Figure 8:
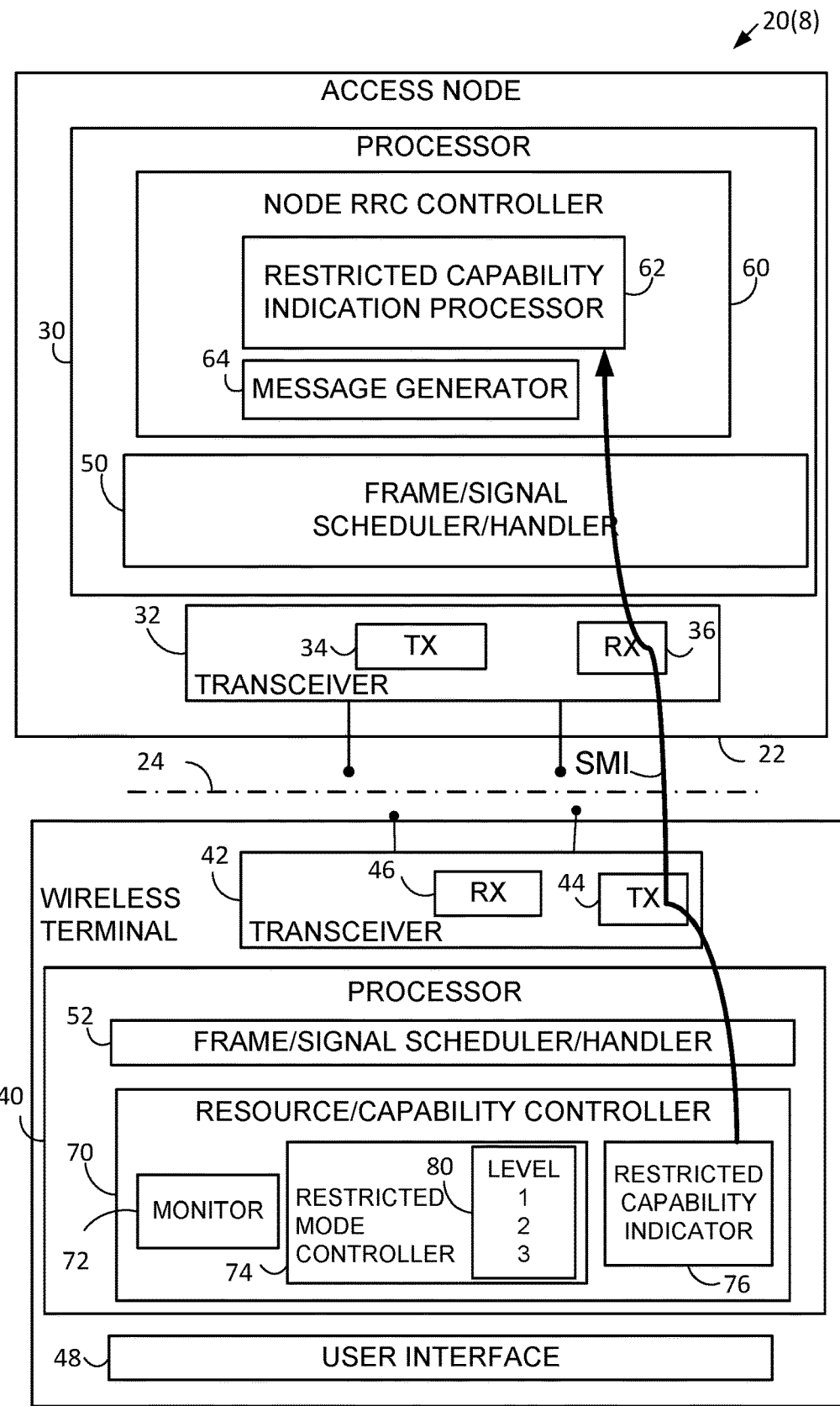
FIG. 8 is a schematic view showing an example generic communications system comprising a radio access node and a wireless terminal, wherein the wireless terminal is capable of operating in plural levels of safe mode and of generating a restricted capability indication for transmission to the access node.

FIG. 8 shows another example embodiment and mode of a wireless terminal, e.g., wireless terminal 26(8), which operates in conjunction with communication system 20(8). Unless otherwise noted, the structure and operation of all similarly referenced elements of communication system 20(8), including access node 22 and wireless terminal 26(8), are identical to FIG. 3. The example embodiment and mode of FIG. 8 primarily differs from the embodiment and mode of FIG. 3 in that, in the FIG. 8 embodiment and mode, the Safe mode may be classified according to plural levels, e.g., as Level 1, Level 2, and Level 3.

In other words, wireless terminal 26(8) of FIG. 8 may differ from the wireless terminal of FIG. 3 in that restricted mode controller 74 is enhanced to operate at any one time in one of plural levels of restricted capability operation. The plural levels of restricted capability operation correspond to plural degrees of severity of unavailability of resources or capabilities of the wireless terminal 26(8). Accordingly, restricted mode controller 74 of FIG. 8 is shown as comprising level mode sub-controller 80. Thus, the wireless terminal 26(8) of FIG. 8 comprises terminal processor 40, which includes terminal resource/capability controller 70, and transmitter circuitry 44. The terminal processor 40 is configured, e.g., (1) to make a determination that one or more capabilities supported by the wireless terminal is temporarily not available at the wireless terminal, and (2) based on the determination, to enter one of plural levels of restricted capability operation, the plural levels of restricted capability operation corresponding to plural degrees of severity of unavailability. The transmitter circuitry 44 is configured to optionally transmit a restricted capability indication over the radio interface to the access node. The restricted capability indication may comprise, or be accompanied by, an indication of the safe mode level.

Figure 9:
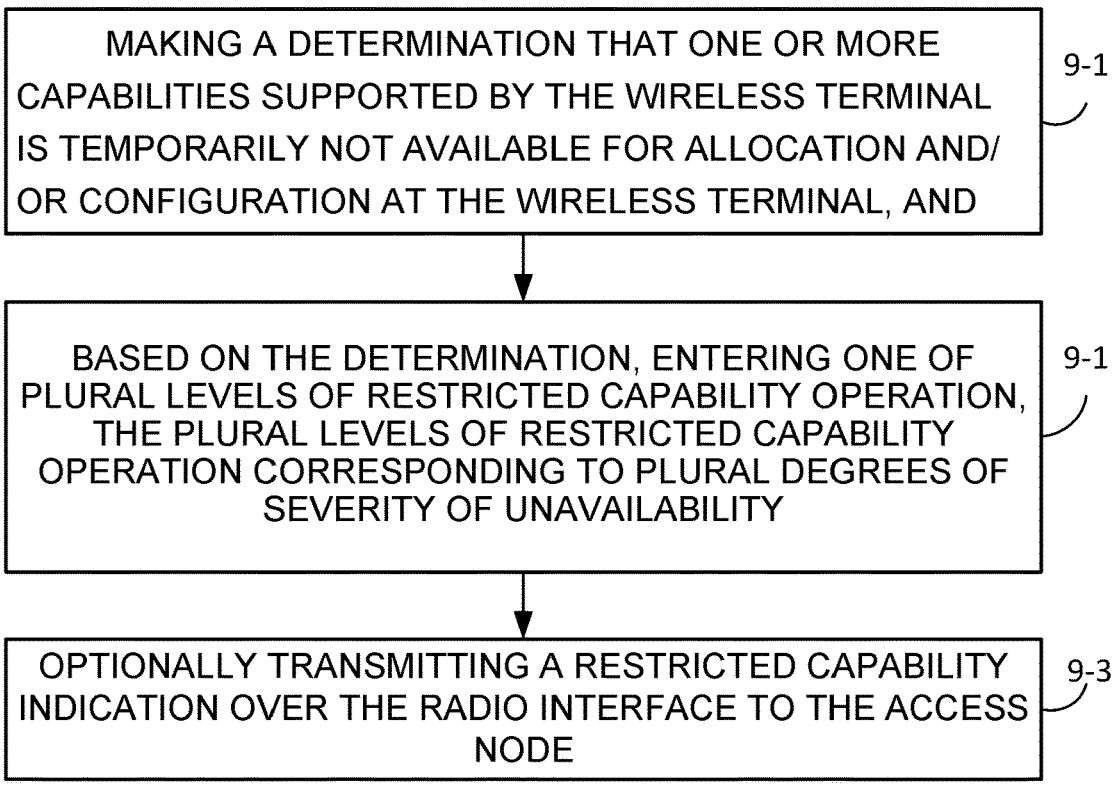
FIG. 9 is a flowchart shows basic, representative, non-limiting acts or steps that may be performed by the wireless terminal of FIG. 8.

FIG. 9 shows basic, representative, non-limiting acts or steps that may be performed by the wireless terminal 26(8) of FIG. 8. Act 9-1 comprises making a determination that one or more capabilities supported by the wireless terminal is temporarily not available at the wireless terminal. The determination of act 9-1 may be made by terminal monitor 72. Act 9-2 comprises, based on the determination of act 9-1, the wireless terminal and particularly restricted mode controller 74 entering one of plural levels of restricted capability operation. The plural levels of restricted capability operation may correspond to plural degrees of severity of unavailability of resources or capabilities of the wireless terminal. Act 9-3 comprises the transmitter circuitry 44 optionally transmitting a restricted capability indication over the radio interface to the access node. The restricted capability indication may indicate which one of plural levels of restricted capability operation has been entered by the wireless terminal.

As indicated above, the plural levels of restricted capability operation may correspond to plural degrees of severity of unavailability of resources or capabilities of the wireless terminal. In an example embodiment and mode, the plural levels may be structured or configured as follows:

at least one of the plural values for the restricted capability indication may indicate that the wireless terminal has restricted a network independent wireless terminal capability. In other words, the wireless terminal 26(8) has restricted a capability such as an application in which the network is not interested nor which necessarily consumes or utilizes network resources, such as a calendar or notes application of the wireless terminal 26(8), for example.

at least one of the plural values for the restricted capability indication may request and/or require approval by the access node for the wireless terminal to restrict one or more wireless terminal capabilities, e.g., the wireless terminal and the access node may negotiate which particular wireless terminal capabilities may be restricted when the wireless terminal operates in safe mode.

at least one of the plural values for the restricted capability indication may indicate that the wireless terminal has restricted wireless terminal capability to support a set of basic operations, such as monitoring DCCH, receiving Paging, support of Emergency calls.

As a non-limiting illustrative example, Level 3 may be highest in terms of severity. In case of Level 3 Safe Mode, the wireless terminal 26(8) may be able to support basic fallback mode of operations, such as monitoring DCCH, receiving Paging, support of Emergency calls. For Level 1 Safe mode, the wireless terminal 26(8) may not need the approval of base station (gNB) to go into Safe Mode operation. Level 2 Safe mode may require the wireless terminal 26(8) to obtain access node 22, e.g., gNB, approval and may permit the wireless terminal 26(8) to pre-empt some running processes/applications/services in certain cases. Once the wireless terminal 26(8) indicates Safe-Mode operation, the access node 22 may perform UE capability transfer procedures.

It should be understood that the number of levels is not limited to any particular plural number, and that one or more levels may even comprise sub-levels. Table 1 shows an example safe mode multi-level configuration wherein at least one of the safe mode levels may comprises sub-levels.

TABLE ONE

EXAMLPLE SAFE MODE LEVELS

| Features to be suspended | level |
|---|---|
| All but Essential Capabilities (basic radio operation to support emergency calls, DCCH monitoring,) are suspended | Safe Mode Level 3 |
| Low priority capabilities: Multi-carrier, dual connectivity, MIMO, SUL, | Safe Mode Level 2-A |
| High priority capabilities: | Safe Mode Level 2-B |
| WLAN, Bluetooth, GPS, GPS applications, Multimedia applications (EMAIL, Calendar, Clock, Camera, Video, Audio, . . . etc.), , Airplane mode, background IP traffic, maps, pictures, . . . etc. | Safe Mode Level 1 |

Table 1 also illustrates that a safe mode level may be associated with a list or a group of capabilities or features supported by the wireless terminal 26(8).

Figure 10A:
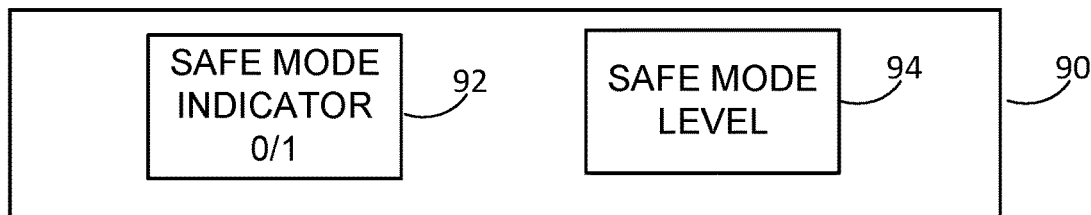
FIG. 10A and FIG. 10B are diagrammatic views showing differing formatting or expressions of an indicating a level of safe mode operation.
Figure 10B:
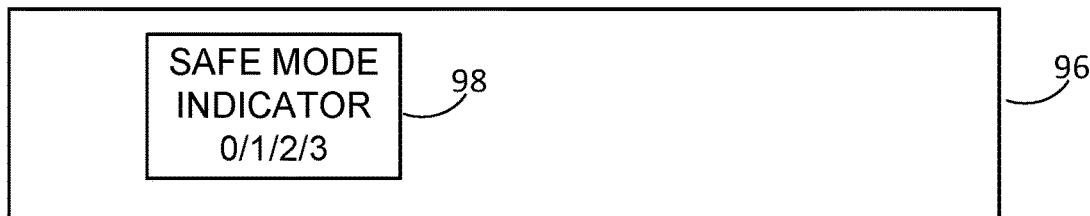

As mentioned above, the restricted capability indication may comprise, or be accompanied by, an indication of the safe mode level. For example, as shown in FIG. 10A, a message 90 that includes an information element 92 for expressing the restricted capability indication/safe mode indication may include an additional field 94 that expresses the safe mode level. Alternatively, as shown in FIG. 10B, a message 96 that includes an information element 98 for expressing the restricted capability indication/safe mode indication may has one of plural values corresponding to the plural levels of restricted capability operation. For example, the information element 98 may specify that the wireless terminal 26(8) in not in safe mode (value 0), or if the wireless terminal 26(8) in in safe mode, in which of the plural levels (e.g., 1/2/3) the wireless terminal 26(8) operates. FIG. 10A and FIG. 10B thus serve, in non-limiting fashion, to illustrate that level of safe mode operation may be formatted in any appropriate manner for transmission to access node 22.

A an indication of level of safe mode operation for wireless terminal 26(8) may be provided in one or more messages of any appropriate scenario, including but not limited to the scenarios of FIG. 7A-FIG. 7K. In any such scenario the indication of level of safe mode operation for wireless terminal 26(8) may be provided as part of or in conjunction with the restricted capability indication/safe mode indication.

Hereinafter, discussion of wireless terminal 26 is not limited to any particular embodiment, and both wireless terminal 26 of FIG. 3 and wireless terminal 26(8) of FIG. 8 may be encompassed.

In an example embodiment and mode, the wireless terminal 26 may autonomously go into a Safe Mode in either Idle/inactive/connected mode, and in any transition phases. Moreover, in a connected mode, non-configured and non-active capabilities can be suspended autonomously without access node 22 approval, e.g., without gNB approval.

In an example embodiment and mode, wireless terminal 26, also known as the UE, may inform access node 22, which may be a gNB, about its Safe Mode in any one or more of the following situations:
1. UE tries to downgrade active feature/capability(s) as a direct result of UE internal condition (Entering Safe-Mode),
2. gNB attempts to reconfigure active feature(s) that would affect/impact the UE status/condition, i.e., drive the UE into Safe-mode operation,
3. gNB sends RRC Reconfiguration message for the suspended feature or capabilities while the UE is in Safe-mode.
4. If UE tries to establish a new connection or resume a suspended connection while in Safe Mode
5. gNB requests UE Capability information In a connected mode, the wireless terminal 26 may determine if a configured active feature (e.g., MIMO Rank 4) is not sustainable due to wireless terminal conditions and that the wireless terminal needs to downgrade or suspend the feature. In such case, the wireless terminal may send a reconfiguration request with the supported feature (e.g., MIMO Rank 2 or MIMO Rank 1) to access node 22 indicating a Safe-Mode Operation with a list of available alternatives. The wireless terminal may also request access node 22 to suspend the service using the configured feature all together. The wireless terminal may further request that access node 22 stop any reconfiguration attempts for any new service for the suspended features.

After receiving Safe mode indication and available capability list/group, the access node 22 may request additional information from the wireless terminal 26 operating in Safe Mode regarding other suspended features.

The wireless terminal 26 may suspend local features or inactive features/services within the wireless terminal 26 without network (e.g., gNB) approval.

The wireless terminal 26 may maintain basic features (for example, RRM measurements, Initial Access BWP, Rank 1 transmission, random access procedure (PRACH transmission, RAR reception, Msg 3 transmission, Msg4 reception), etc.) active in certain Safe Mode level (e.g., Safe Mode-3) or the wireless terminal 26 may Power OFF.

The UECapabilityEnquire message may include Safe-Mode indication, which informs the wireless terminal 26 that this is based on a previous Safe mode indication by t wireless terminal 26, then wireless terminal 26 shall respond with a list of all features that are suspended, may may add the cause for Safe Mode indication (system overloading, Memory overloading, Utilization issues, configuration issue, operational issues, ... etc.), the response may also indicates the access node 22 should stop any reconfigurations for the suspended features for pre-determine period of time.

The UECapabilityEnquire message may also include full configuration indication beside the Safe-Mode indication, which informs wireless terminal 26 that this message is based on a previous Safe mode indication by wireless terminal 26, and that wireless terminal 26 MAY respond with a list of all features, suspended, non-active, and active.

Figure 11:
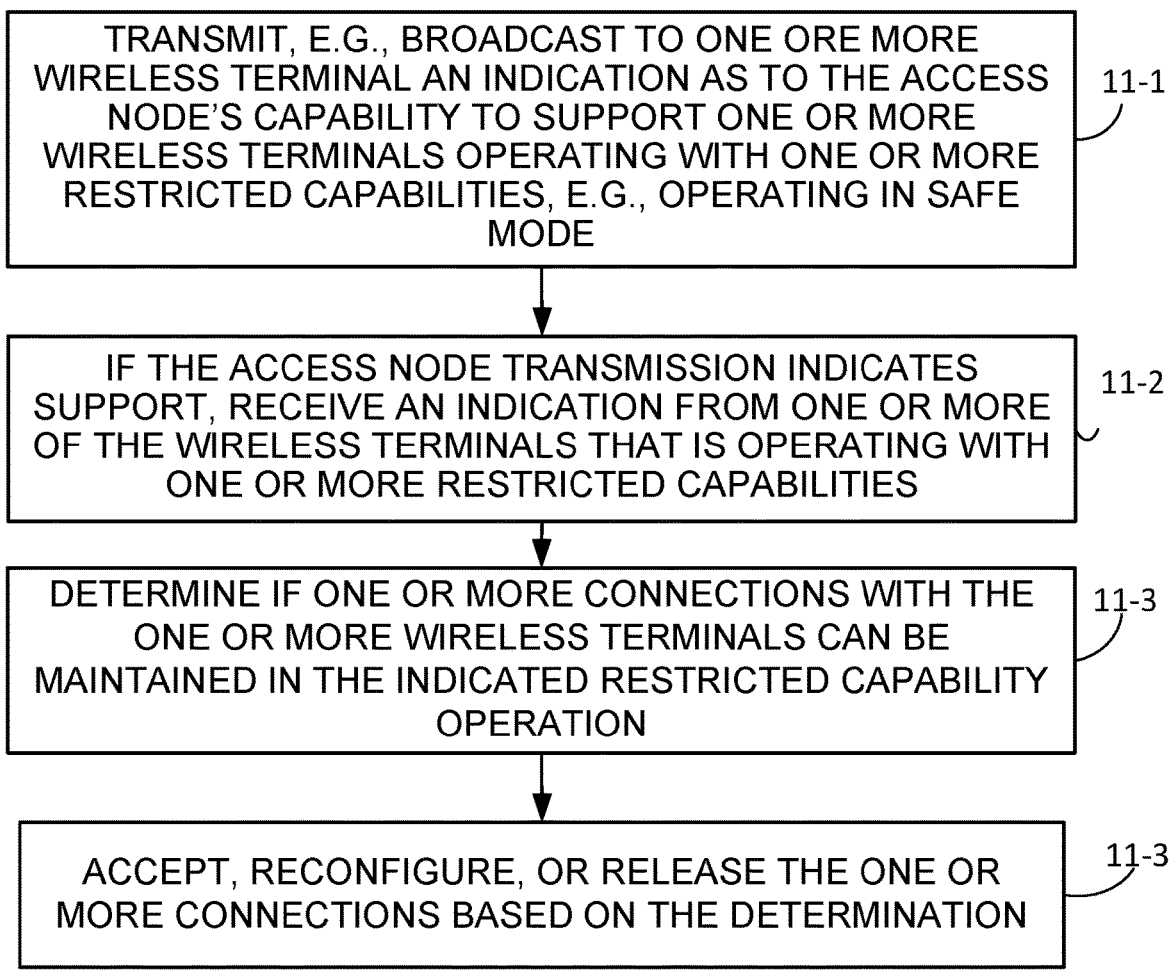
FIG. 11 is a flowchart showing example, non-limiting, representative acts or steps that may be performed by an access node in another example embodiment.
Figure 12:
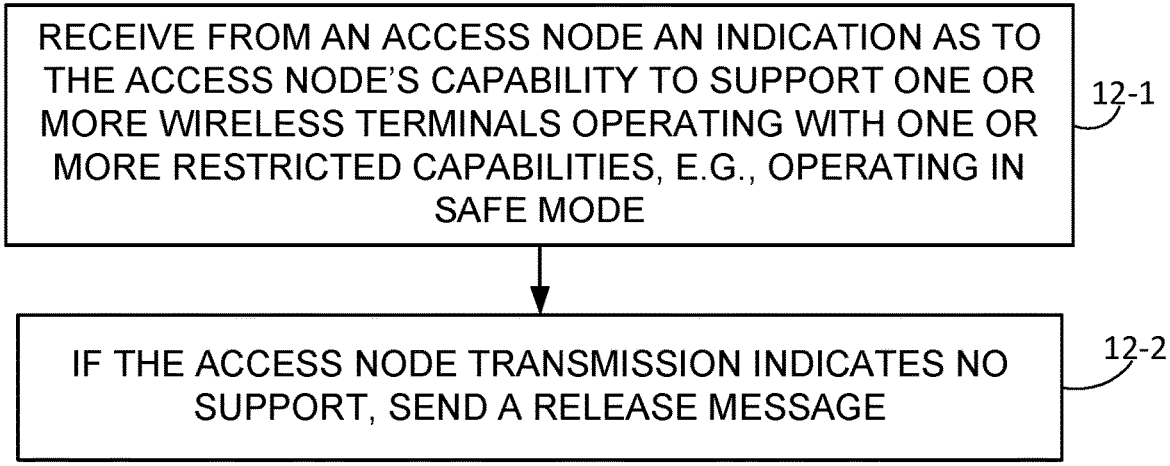
FIG. 12 is a companion flowchart to FIG. 11 showing example, non-limiting, representative acts or steps that may be performed by a wireless terminal when the access node sends a capability support message.
Figure 13:
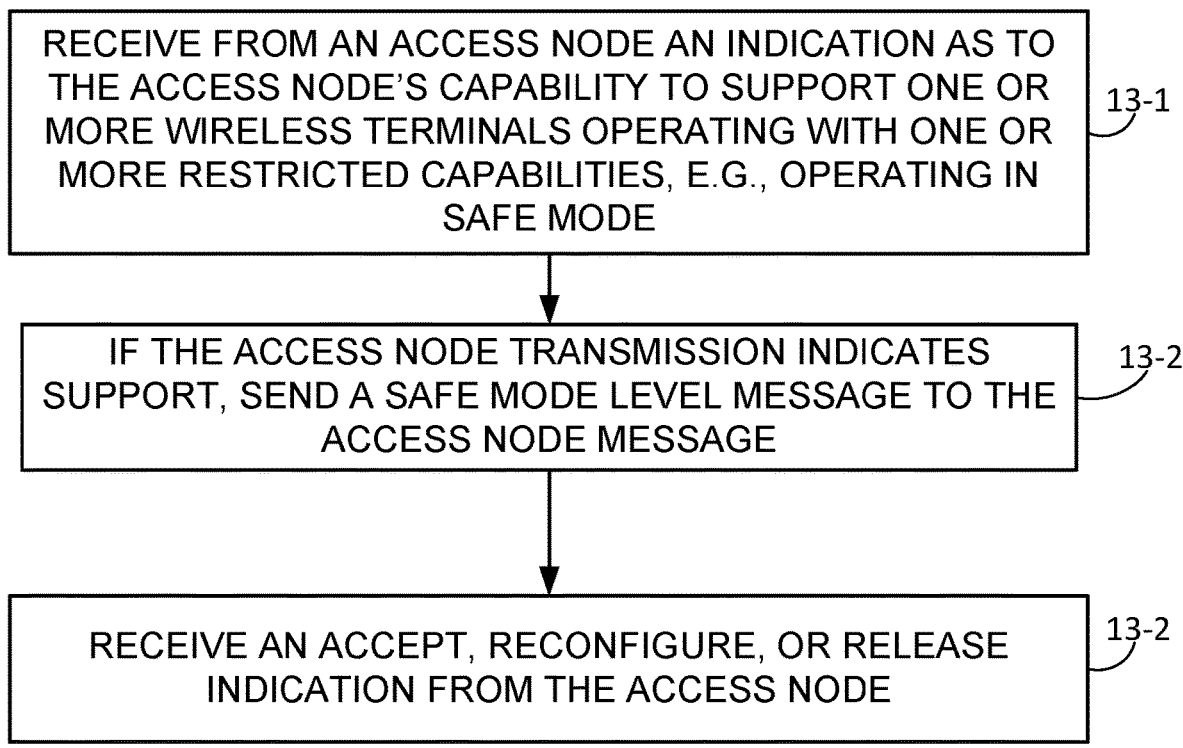
FIG. 13 is a companion flowchart to FIG. 11 showing example, non-limiting, representative acts or steps that may be performed by a wireless terminal when the access node sends a message that the access node does not have capability support a restricted mode of operation of the wireless terminal.
Figure 14:
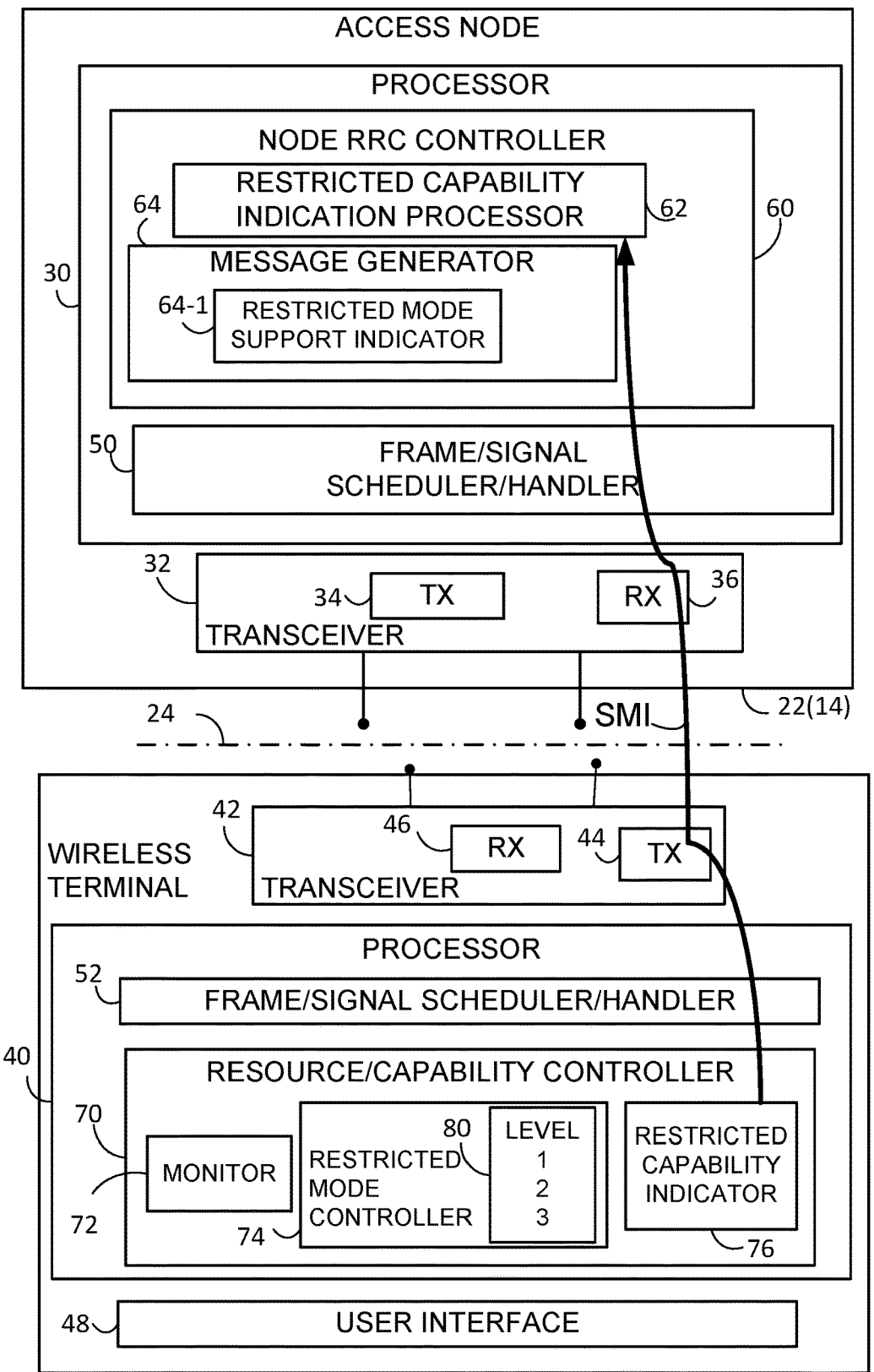
FIG. 14 is a schematic view showing an example communications system comprising a radio access node and a wireless terminal, where the wireless terminal is capable of operating in a safe mode, and where the radio access node and the wireless terminal exchange messages relating to a restricted capabilities of the wireless terminal and capabilities of the access node to handle a connection with the wireless terminal having restricted capabilities.
Figure 15A:
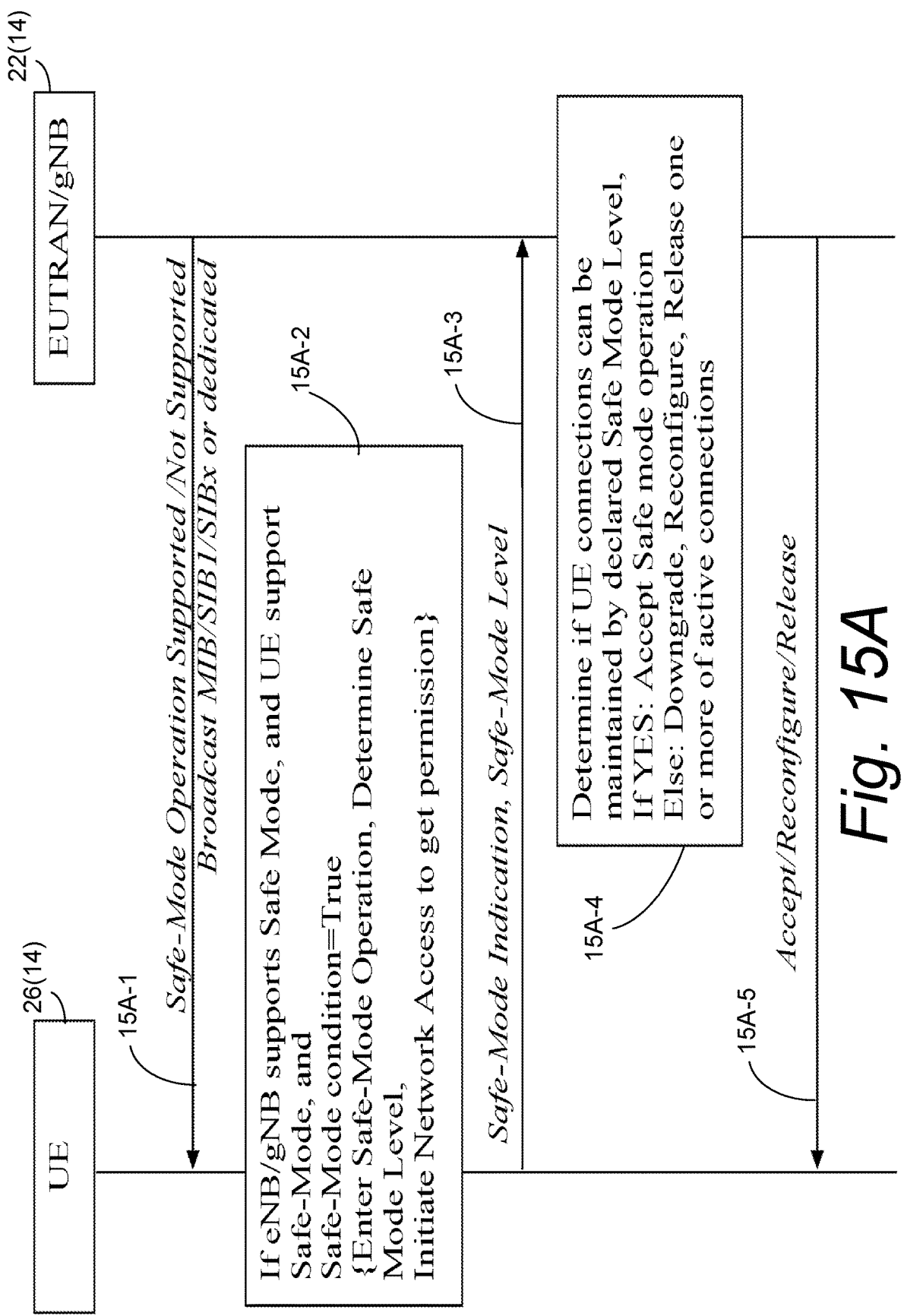
FIG. 15A is a schematic view showing an example of a call flow of Network Controlled Safe-Mode Operation, wherein the access node and wireless terminal are capable of operating in plural levels of safe mode and of generating of an indication from the access node to the wireless terminal.
Figure 15B:
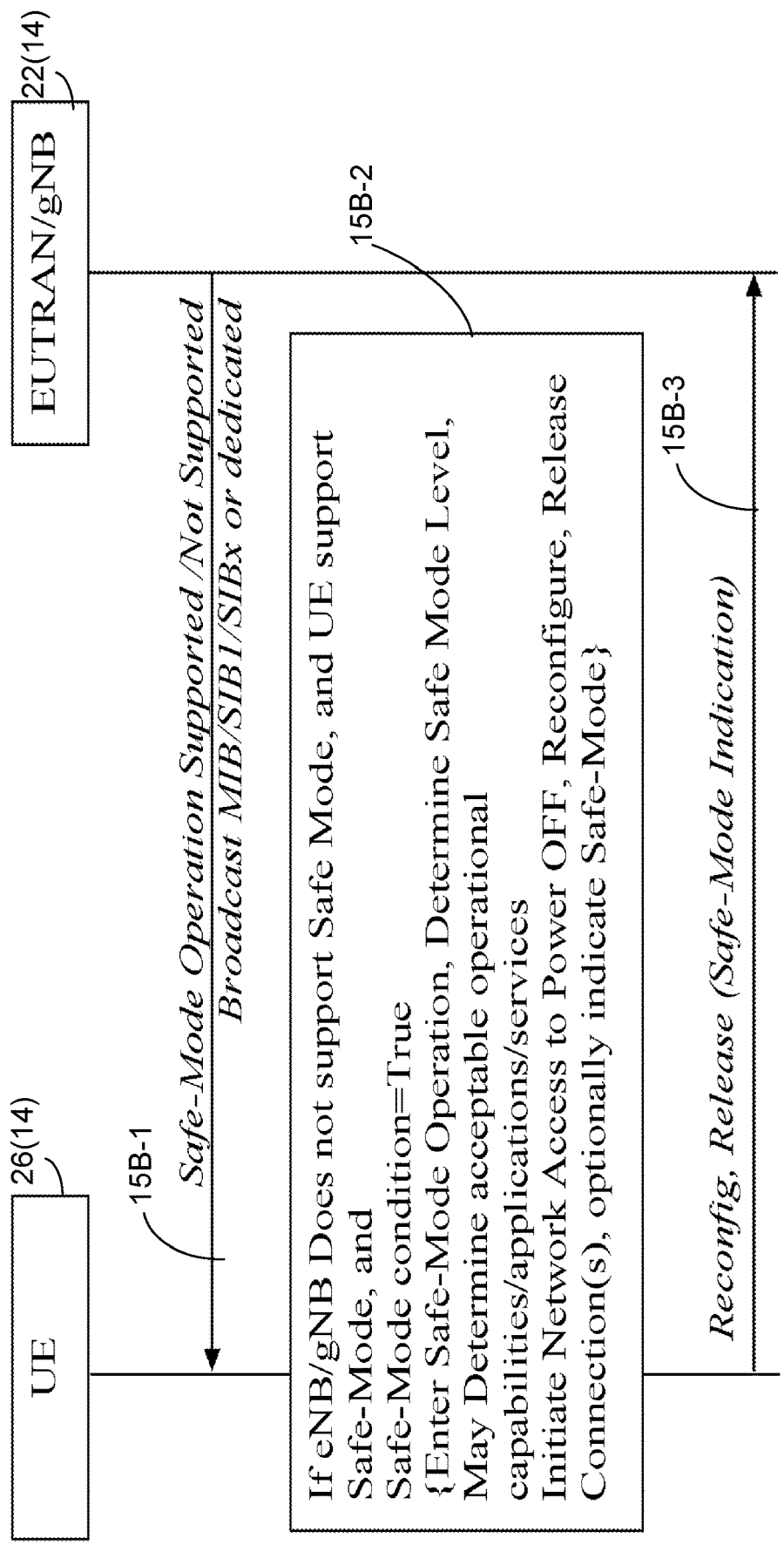
FIG. 15B is a schematic view showing an example of a call flow of Network Controlled Safe-Mode Operation, wherein the access node is not capable of operating in plural levels of safe mode and generating by the UE of an indication to the access node of the wireless terminal request based on its safe-mode operation.
Figure 15C:
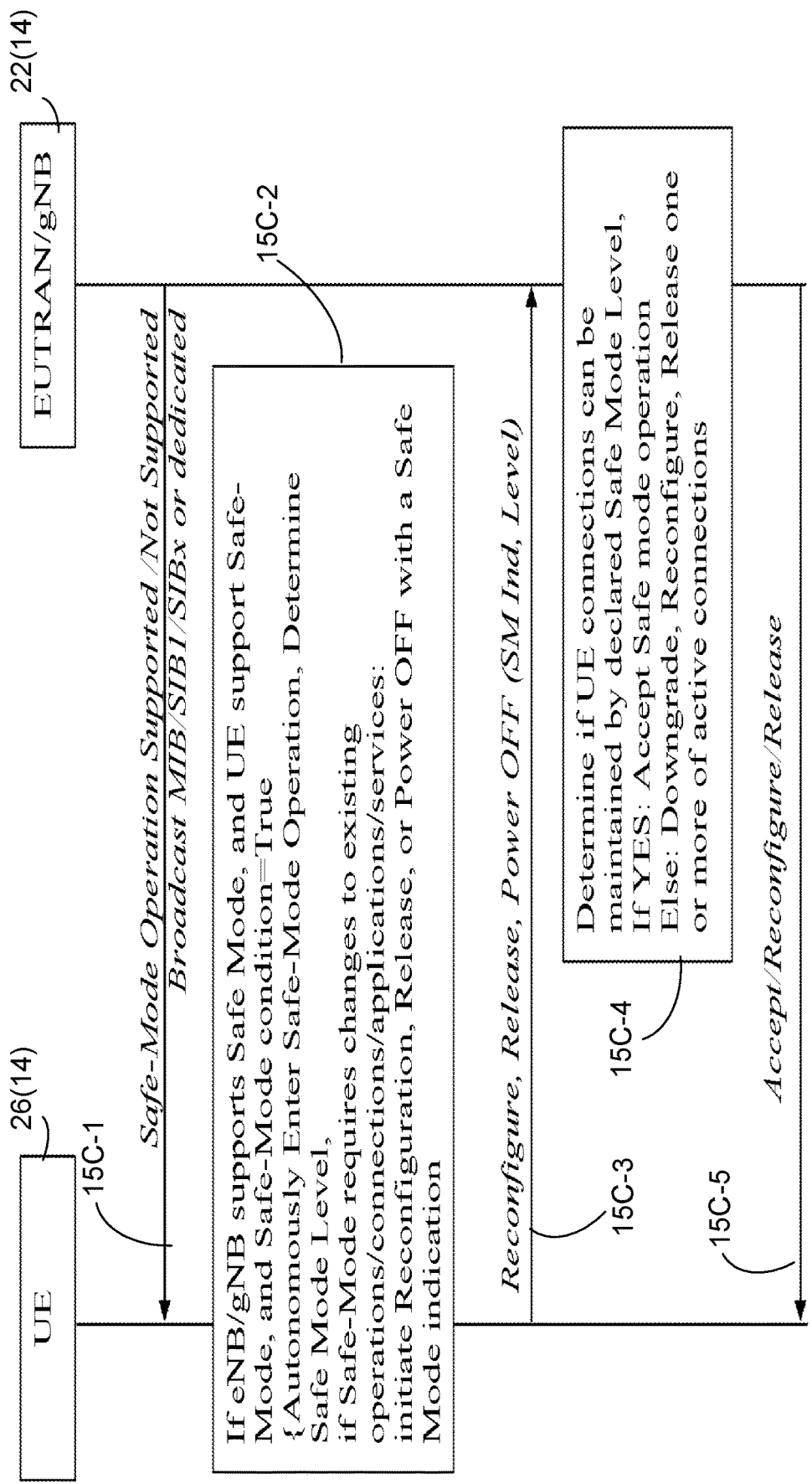
FIG. 15C is a schematic view showing an example of a call flow of UE-based Safe-Mode Operation, wherein the access node is capable of operating in plural levels of safe mode and a decision process by the UE on how to proceed and the indication to the access node of the wireless terminal request based on its safe-mode operation.

If the access node 22 does not allow the Safe-mode operation, the wireless terminal 26 may drop the service/application or Powers off The access node 22 may re-configure the wireless terminal 26 to a lower configuration to alleviate the UE conditions or ask the wireless terminal 26 to Power off FIG. 14 is a schematic view showing an example generic communications system comprising a radio access node 22(14) and a wireless terminal 26(14) similar to that in FIG. 8, where the wireless terminal 26(14) is capable of operating in a safe mode. However, in FIG. 14, the radio access node 22(14) and the wireless terminal 26(14) exchange messages relating to a restricted capabilities of the wireless terminal 26(14) and capabilities of the access node to handle a connection with the wireless terminal 26(14) having restricted capabilities. Example acts or steps performed by access node 22(14) are shown in FIG. 11: example acts or steps performed by wireless terminal 26(14) are shown in FIG. 12 and FIG. 13. Example messaging is illustrated in FIGS. 15A-15C and described below.

FIG. 11 is a flowchart showing example, non-limiting, representative acts or steps that may be performed by an access node in another example embodiment. The access node reference in the flowchart of FIG. 11 may be an access node of a radio access network (RAN) participates in communications over a radio interface with one or more wireless terminals 26(14) of the radio access network (RAN). In an example embodiment and mode, the access node comprises transmitter circuitry 34 configured to transmit (e.g., broadcast) to one or more wireless terminals an indication as to the access node's capability to support one or more wireless terminals operating with one or more restricted capabilities (e.g., operating in SafeMode) (step 11-1). The indication as to the access node's capability to support one or more terminals with one or more restrictive capabilities may be generated by the restricted capability indication message generator 64-1 under control of the restricted capability indicator processor 62 shown in FIG. 14. If the access node transmission indicates it is capable of supporting one or more wireless terminals operating with one or more restricted capabilities (e.g., operating in Safe-Mode), then receiver circuitry 36 in the access node 22(14) is configured to receive an indication from the one or more wireless terminals that is operation with one or more restricted capabilities (step 11-2). In that case, processing circuitry 30 in the access node 22(14) is configured to determine if one or more connections with the one or more wireless terminals can be maintained in the indicated restricted capability operation (step 11-3). Based on that determination the processing circuitry 30 is configured to accept, reconfigure, or release the one or more connections (step 11-4). In another of its example aspects the technology disclosed herein concerns method of operation of such an access node.

FIG. 12 is a companion flowchart to FIG. 11 showing example, non-limiting, representative acts or steps that may be performed by a wireless terminal 26(14) when the access node 22(14) sends a capability support message. The wireless terminal 26(14) comprises processor circuitry 40 and transmitter circuitry 44 and receiver circuitry 46. In an example embodiment and mode, the receiver circuitry 46 is configured to receive from the access node 22(14) an indication as to the access node's capability to support one or more wireless terminals operating with one or more restricted capabilities (e.g., operating in SafeMode) (act 12-1). If the access node's transmission indicates it is not capable of supporting one or more wireless terminals operating with one or more restricted capabilities (e.g., operating in SafeMode), and if monitor 72 and restricted mode controller 74 determine that wireless terminal 26(14) needs to enter safe mode, then the transmitter circuitry 44 is configured to send a release indication (e.g., a Release message) to the access node 22(14) (act 12-2).

FIG. 13 is a companion flowchart to FIGS. 11 and 12 showing example, non-limiting, representative acts or steps that may be performed by a wireless terminal 26(14). In an example embodiment and mode, the receiver circuitry 46 is configured to receive from the access node 22(14) an indication as to the access node's capability to support one or more wireless terminals operating with one or more restricted capabilities (e.g., operating in SafeMode) (act 13-1). If the access node transmission indicates it is capable of supporting one or more wireless terminals operating with one or more restricted capabilities (e.g., operating in Safe-Mode), and if monitor 72 and restricted mode controller 74 determine that wireless terminal 26(14) needs to enter safe mode, then the transmitter circuitry 44 is configured to send a safe mode level message to the access node (act 13-2). The receiver circuitry 46 then receives from the access node 22(14) an accept, reconfigure, or release indication (act 13-3). In another of its example aspects the technology disclosed herein concerns methods of operation of such a wireless terminal 26(14).

FIG. 15A is a schematic view showing an example of a call flow of Network Controlled Safe-Mode Operation in a communications system comprising radio access node 22(14) and wireless terminal 26(14), wherein the access node and wireless terminal 26(14) are capable of operating in plural levels of safe mode and of generating of an indication from the access node to the wireless terminal 26(14). The wireless terminal 26(14) 26 comprises processor circuitry 40 and transmitter/receiver circuitry 42. As shown by act 15A-1, the wireless terminal 26(14) receives access node 22 information regarding the access node 22 capability to support Safe-mode operation and may also receive information pertaining to the various levels supported. The access node 22(14) capability information may be received on System Information Block (e.g., MIB, SIB1, SIBx), or it can be provided to the UE on-demand where the UE can request such information directly or indirectly. The access node 22 safe-mode capability information may also be communicated in a dedicated signaling between the access node 22 (e.g., gNB or eNB) and the wireless terminal 26(14) (e.g., msg-3, msg-4, RRC message, or using MAC CE). When the wireless terminal 26(14) receives an indication of access node 22(14) support, and in case of a determination that one or more capabilities supported by the wireless terminal 26(14) is temporarily not available at the wireless terminal 26(14), the UE may decide, as shown by act 15A-2, to enter, autonomously or based on a permission from the access node 22(14), one of plural levels of restricted capability operation, the plural levels of restricted capability operation corresponding to plural degrees of severity of local condition within the wireless terminal 26(14). In network-based operation, if the access node 22 supports safe-mode operation, the wireless terminal 26(14) may decide to inform the access node 22(14) of its impending condition/situation and wait for a respond on how to act. Act 15A-3 shows wireless terminal 26(14) informing the access node 22(14) of the impending condition. The access node 22(14) then develops a response, shown by act 15A-4. Depending on the access node 22(14) response, as shown by act 15A-5 the wireless terminal 26(14) may continue to operate within a set of capability restrictions for a pre-defined period of time (configured by the access node 22). The wireless terminal 26(14) may also terminate or down grade its current operations depending on the access node 22(14) directives. The wireless terminal 26(14) may also power-down or time out. When the Safe-mode condition is resolved and the wireless terminal 26(14) returns to normal operation, the wireless terminal 26(14) may inform the access node 22 of its status.

FIG. 15B is a schematic view showing an example of a call flow of network controlled safe-mode operation where the access node 22(14) is not capable of operating in plural levels of safe mode and not capable of receiving from the UE of an indication to the access node of the wireless terminal request based on its safe-mode operation. Act 15B-1 shows access node 22(14) sending a message to wireless terminal 26(14) to indicate that access node 22(14) does not support safe mode. In the case where the access node 22(14) does not support safe-mode operation, as reflected by act 15B-2 the wireless terminal 26(14) acts autonomously and triggers a downgrade, release, time-out, or other suitable action depending the level of severity. Thereafter the wireless terminal 26(14) may send a suitable message to access node 22(14), e.g., to specify reconfiguration or release of the connection, as shown by act 15B-3, with a safe mode indication.

FIG. 15C is a schematic view showing an example of a call flow of network controlled safe-mode Operation where the access node is capable of operating in plural levels of safe mode and is capable receiving an a safe mode indication from the wireless terminal 26(14). Act 15C-1 shows access node 22(14) sending a message to wireless terminal 26(14) indicating that safe mode is supported by the access node 22(14). As shown by act 15C-2, upon receipt of the message of act 15C-1 wireless terminal 26(14) may decide autonomously to activate safe-mode operation and determine the safe-mode level, and hence may determine a list of restricted capabilities, Applications, Procedures, Operations. These operations/capabilities can be RAN-based capabilities (i.e., Access Stratum (AS) based such as MIMO operation, Modulation/Coding adaptation, Carrier Aggregation, Dual Connectivity, Multi-carrier, Supplementary UL support, Band Width Part (BWP) operations, etc.). The operations/ Capabilities may also include Non-Access Stratum (NAS) capabilities (Core-Network functions, procedures such as Area Updates or Periodic Updates; or applications such as IP-based application, Email, IMS, Location-based Services, Supplementary Services, etc.). In such case, if the access node 22(14) is capable of supporting safe-mode then the wireless terminal 26(14) should behave according to the previously described operations, e.g., informing, in a limited set of scenarios, the access node 22(14) that it is operating in a safe-mode and indicate the safe-mode level. As act 15C-3 the wireless terminal 26(14) may send a message with the safe mode indication, either reconfiguring or releasing the connection, or providing a power off indication. As shown by act 15C-4, access node 22(14) may accept, reject, or modify the wireless terminal 26(14) configuration based on the information received. As act 15C-5, the access node 22(14) may send an appropriate message to wireless terminal 26(14), such as an accept, reconfiguration, or release message.

The UECapabilityInquire message may include safe-mode question, which request information whether the wireless terminal 26(14) supports safe mode operation. Then the wireless terminal 26(14) responds with an indication whether it supports a safe-mode operation and/or a list or the level (group of capabilities) of all features that are suspended in such operation.

The UECapabilityInquire message may also include full configuration indication beside the Safe-Mode indication, which informs the wireless terminal 26(14) that this message is based on a previous Safe mode indication by the wireless terminal 26(14), and that the wireless terminal 26(14) should respond with a list of all features, suspended, non-active, and active.

During the UE Safe mode operation, the wireless terminal 26(14) may drop RAN based operations and CN based operation such Routing Area Updates, Tracking Area Updates, Periodic Updates, etc.

Features from each of the example embodiments and modes described herein may be combined with one another. For example information elements described in conjunction with the example embodiment and mode of FIG. 8 may also be utilized with the other example embodiments and modes described herein, including but not limited to the example embodiment and mode of FIG. 7A through FIG. 7K. Further, features of the "Example Embodiments" enumerated hereinafter may also be used in conjunction with one another.

Certain units and functionalities of node 22, wireless terminal 26(14), and wireless terminal 26(8) are, in example embodiments, implemented by electronic machinery, computer, and/or circuitry. For example, the node processors 30 and terminal processors 40 of the example embodiments herein described and/or encompassed may be comprised by the computer circuitry of FIG. 11. FIG. 11 shows an example of such electronic machinery or circuitry, whether node or terminal, as comprising one or more processor(s) circuits 140, program instruction memory 142; other memory 144 (e.g., RAM, cache, etc.); input/output interfaces 146; peripheral interfaces 148; support circuits 149; and busses 150 for communication between the aforementioned units.

The program instruction memory 142 may comprise coded instructions which, when executed by the processor(s), perform acts including but not limited to those described herein. Thus is understood that each of node processor 30 and terminal processor 40, for example, comprise memory in which non-transient instructions are stored for execution.

The memory 144, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 149 are coupled to the processors 190 for supporting the processor in a conventional manner. These circuits include cache, power supplies, clock circuits, input/output circuitry and subsystems, and the like.

Further, it should be understood that, when a processor or processor circuitry is mentioned in conjunction with any of the preceding example embodiments and modes, it should be understood that the device hosting the processor, whether wireless terminal or access node, may comprise at least one processor and at least one memory including computer program code, the memory and the computer program code being configured to, working with the at least one processor, to cause the host device to perform the functions aforedescribed.

Thus, the technology disclosed herein solves problems in the field of telecommunications, including problems in telecommunications nodes such wireless terminals and access nodes, as well as computers/processors and hardware comprising such nodes. Monitoring and protection of wireless terminal is extremely important, lest the wireless terminal not over-extend themselves in operation. But such monitoring and protection is challenging, particularly in view of numerous telecommunications or other functions that may be simultaneously on-going at the wireless terminal. The timing and manner of communicating needed protection, such as the safe mode described herein, is also problematic. Whereas previously such protection required coordination with the network, in example embodiments and modes described herein an improvement is provided wherein the wireless terminal may autonomously declare a safe mode and indicate the safe mode to an access node. Such autonomous declaration and entry of same mode may be but one of plural levels of safe mode provided as an improvement by the wireless terminal. Moreover, the technology disclosed herein solves problems of efficiently indicating wireless terminal protection to the network, e.g., using one or more of the various restricted capability indications/safe mode indications disclosed herein. The technology disclosed herein thus avoids waste of time, undue expenditure of processing resources, and decreases network signaling.

The technology of this application recognizes and observes the following:

Observation 1: UE is the one that reports its capability upon gNB request, and only the UE can detect local condition and local events (processing overloading, overheating, . . . etc.)

Observation 2: The UE may inform the gNB of the UE's abnormal condition, however, the gNB can only prevent the UE from scaling (upgrading) up the UE's own capabilities.

Observation 3: The gNB should not deny the UE operating in a safe mode from downgrading its capabilities and/or operations. If the UE is not capable of supporting certain operations or procedures due to internal issues, it is not rational for gNB to deny its Safe-mode operation.

Observation 4: The UE is supporting many processes and applications that are local which the network have no control over such as Pictures, Calendar, Recorders, Camera, etc.

Observation 5: The UE operating in a Safe-Mode should be able to minimize the signalling with the gNB as much as possible.

Observation 6: The UE is the one which is capable of detecting that/when abnormal conditions are over, and hence the UE should be able to revert back to a normal mode of operation.

Observation 7: The UE should inform the network when the UE reverts back to a normal mode of operations.

In view of these observations and for other reasons, it is disclosed herein that, e.g.

1. The UE may, upon detection of abnormal operational conditions, be able to autonomously declare a Safe-Mode of operation without permission from the network.
2. The UE may be able to determine the Safe-Mode level (e.g., Level-1, Level-2, Level-3, etc.) depending on the severity of local condition. These levels can be configured or can be left for implementations.
3. The Safe-Mode level may be associated with a list or a group of capabilities or features supported by the UE.
4. The UE operating in Safe-Mode may be able to suspend the group or list of capabilities associated with the Safe-Mode Level without gNB permission.
5. UE operating in a Safe-Mode may be able to start suspending local applications and processes (lowest Safe-Mode Level) without informing the gNB at all.
6. There may be a list of capabilities that the UE may suspend without informing gNB in order to minimize over the air signalling.
7. The UE operating in Safe-Mode may be able to disable inactive capabilities without informing gNB as long as it is not affecting active capabilities/features.
8. The UE may indicate Safe-Mode operation only when attempting to down-grade or release existing active capabilities and/or establishing a new service while operating in a Safe-Mode.
9. The gNB may deny the down-grading of certain features/capabilities and instructs the UE to release the service.
10. The UE, while operating in Safe-Mode, may reject the re-configuration or establishment of new services and indicate to the network that it is in Safe-Mode operation with optional information about the severity level or a list of supported capabilities (or supported capability groups).
11. The network may request additional capability information from the UE when it receives the Safe-Mode indication.
12. The UE may inform the network of its Normal-Mode of operation once the Safe-mode condition(s) is(are) alleviated.
13. The UE may, upon detection of abnormal operational conditions, be able to autonomously declare a Safe-Mode of operation without a permission from the network.
14. The UE may determine the Safe-Mode level (e.g., Level-1, Level-2, Level-3, etc) depending on the severity of local condition. These levels can be configured or can be left for implementations.
15. Safe-Mode level may be associated with a list or a group of capabilities or features supported by the UE.
16. The UE operating in Safe-Mode may suspend the group or list of capabilities associated with the Safe-Mode Level without gNB permission.
17. UE operating in a Safe-Mode may start with suspending local applications and processes (lowest Safe-Mode Level) without informing the gNB at all.
18. There should be a list of capabilities that the UE may suspend without informing gNB in order to minimize over the air signalling.

19. The UE operating in Safe-Mode may disable inactive capabilities without informing gNB as long as it is not affecting active capabilities/features.
20. The UE may indicate Safe-Mode operation only when attempting to down-grade or release existing active capabilities and/or establishing a new service while operating in a Safe-Mode.
21. The gNB may deny the down-grading of certain features/capabilities and may instruct the
UE to release the service.
22. The UE, while operating in Safe-Mode, may reject the re-configuration or establishment of new services and indicate to the network that it is in Safe-Mode operation with optional information about the severity level or a list of supported capabilities (or supported capability groups).
23. The network may request additional capability information from the UE when it receives the Safe-Mode indication.
24. The UE may inform the network of its Normal-Mode of operation once the Safe-mode condition(s) is(are) alleviated
25. One or more capabilities (or One or more capabilities within a group of capabilities, one or more capabilities within a capability groups) may be defined as default capabilities (or basic capabilities) which the UE may operate in Safe mode.
26. One or more capabilities may be defined as one or more capabilities which the UE cannot suspend.

The technology of this application thus encompasses but is not limited to the following example embodiments, example features, and example advantages:

Example Embodiment 1

A wireless terminal that participates in communications over a radio interface with an access node of a radio access network (RAN), the wireless terminal comprising: processor circuitry configured to detect an abnormal operation of the wireless terminal and to autonomously declare a Safe-Mode without permission of the radio access network.

Example Embodiment 2

The wireless terminal of Example Embodiment 1, wherein the processor circuitry is further configured to generate a safe mode indication configured to indicate to the access node that one or more capabilities supported by the wireless terminal is temporarily not available at the wireless terminal; and wherein the wireless terminal further comprises transmitter circuitry configured to transmit the safe mode indication over the radio interface to the access node.

Example Embodiment 3

The wireless terminal of Example Embodiment 2, wherein the processor circuitry is configured to generate the safe mode indication to be included as an information element in a UECapabilityInformation message of a UE capability transfer procedure.

Example Embodiment 4

The wireless terminal of Example Embodiment 3, wherein the processor circuitry is further configured to include in the UECapabilityInformation message a listing of available capabilities of the wireless terminal.

Example Embodiment 5

The wireless terminal of Example Embodiment 2, wherein the processor circuitry is configured to generate the safe mode indication to be included as an information element in a RRCConnectionRequest message of a RRC connection establishment procedure.

Example Embodiment 6

The wireless terminal of Example Embodiment 5, wherein the processor circuitry is further configured to include in the RRCConnectionRequest message a listing of available capabilities of the wireless terminal.

Example Embodiment 7

The wireless terminal of Example Embodiment 6, wherein the processor circuitry is further configured to include in another message a listing of further available capabilities of the wireless terminal when requested for the further listing by the access node.

Example Embodiment 8

The wireless terminal of Example Embodiment 2, wherein the processor circuitry is configured to generate the safe mode indication to be included as an information element in a RRCConnectionResumeRequest message of a RRC connection resume procedure.

Example Embodiment 9

The wireless terminal of Example Embodiment 8, wherein the processor circuitry is further configured to include in the RRCConnectionResumeRequest message a listing of available capabilities of the wireless terminal.

Example Embodiment 10

The wireless terminal of Example Embodiment 8, further comprising receiver circuitry configured to receive reconfiguration information for a safe mode of operation for the wireless terminal, and wherein the processor circuitry is further configured to utilize the reconfiguration information for reconfiguring operation of the wireless terminal.

Example Embodiment 11

The wireless terminal of Example Embodiment 2, wherein the processor circuitry is configured to generate the safe mode indication to be included as an information element in a RRCConnectionReconfigurationComplete message generated in response to receipt from the access node of a connection reconfiguration request message of a RRC connection reconfiguration procedure.

Example Embodiment 12

The wireless terminal of Example Embodiment 2, wherein the processor circuitry is configured to generate the safe mode indication to be included as an information element in a RRCConnectionReestablishmentRequest message of a RRC connection re-establishment procedure.

Example Embodiment 13

The wireless terminal of Example Embodiment 12, wherein the processor circuitry is further configured to include in the RRCConnectionReestablishmentRequest message a listing of available capabilities of the wireless terminal.

Example Embodiment 14

The wireless terminal of Example Embodiment 2, wherein the processor circuitry is configured to generate a level of safe mode indication, the level of safe mode indication having one of plural level values depending on a corresponding one of plural types of capability restriction for the wireless terminal.

Example Embodiment 15

The wireless terminal of Example Embodiment 14, wherein at least one of the plural values for the level of safe mode indication indicates that the wireless terminal has restricted a network independent wireless terminal capability.

Example Embodiment 16

The wireless terminal of Example Embodiment 14, wherein at least one of the plural values for the level of safe mode indication requests approval by the access node for the wireless terminal to restrict one or more wireless terminal capabilities.

Example Embodiment 17

The wireless terminal of Example Embodiment 14, wherein at least one of the plural values for the level of safe mode indication indicates that the wireless terminal has restricted wireless terminal capability to support a set of basic operations.

Example Embodiment 18

A method in a wireless terminal that participates in communications over a radio interface with an access node of a radio access network (RAN), the method comprising:
detecting an abnormal operation of the wireless terminal; and
autonomously declaring a safe mode operation without permission of the radio access network.

Example Embodiment 19

The method of Example Embodiment 18, further comprising:
generating a safe mode indication configured to indicate to the access node that one or more capabilities supported by the wireless terminal is temporarily not available at the wireless terminal;
transmitting the safe mode indication over the radio interface to the access node.

Example Embodiment 20

The method of Example Embodiment 19, further comprising generating the safe mode indication to be included as an information element in a UECapabilityInformation message of a UE capability transfer procedure.

Example Embodiment 21

The method of Example Embodiment 20, further comprising including in the UECapabilityInformation message a listing of available capabilities of the wireless terminal.

Example Embodiment 22

The method of Example Embodiment 19, further comprising generating the safe mode indication to be included as an information element in a RRCConnectionRequest message of a RRC connection establishment procedure.

Example Embodiment 23

The method of Example Embodiment 22, further comprising including in the RRCConnectionRequest message a listing of available capabilities of the wireless terminal.

Example Embodiment 24

The method of Example Embodiment 23, further comprising including in another message a listing of further available capabilities of the wireless terminal when requested for the further listing by the access node.

Example Embodiment 25

The method of Example Embodiment 19, further comprising generating the safe mode indication to be included as an information element in a RRCConnectionResumeRequest message of a RRC connection resume procedure.

Example Embodiment 26

The method of Example Embodiment 25, further comprising including in the RRCConnectionResumeRequest message a listing of available capabilities of the wireless terminal.

Example Embodiment 27

The method of Example Embodiment 25, further comprising receiving reconfiguration information for a safe mode operation for the wireless terminal, and wherein the further comprising utilizing the reconfiguration information for reconfiguring operation of the wireless terminal.

Example Embodiment 28

The method of Example Embodiment 19, further comprising generating the safe mode indication to be included as an information element in a RRCConnectionReconfigurationComplete message generated in response to receipt from the access node of a connection reconfiguration request message of a RRC connection reconfiguration procedure.

Example Embodiment 29

The method of Example Embodiment 19, further comprising generating the safe mode indication to be included as an information element in a RRCConnectionReestablishmentRequest message of a RRC connection re-establishment procedure.

Example Embodiment 30

The method of Example Embodiment 29, further comprising including in the RRCConnectionReestablishmentRequest message a listing of available capabilities of the wireless terminal.

Example Embodiment 31

The method of Example Embodiment 19, further comprising generating a level of safe mode indication, the level of safe mode indication having one of plural level values depending on a corresponding one of plural types of capability restriction for the wireless terminal.

Example Embodiment 32

The method of Example Embodiment 31, wherein at least one of the plural values for the level of safe mode indication indicates that the wireless terminal has restricted a network independent wireless terminal capability.

Example Embodiment 33

The method of Example Embodiment 31, wherein at least one of the plural values for the level of safe mode indication requests approval by the access node for the wireless terminal to restrict one or more wireless terminal capabilities.

Example Embodiment 34

The method of Example Embodiment 31, wherein at least one of the plural values for the level of safe mode indication indicates that the wireless terminal has restricted wireless terminal capability to support a set of basic operations.

Example Embodiment 35

A wireless terminal that participates in communications over a radio interface with an access node of a radio access network (RAN), the wireless terminal comprising:
  processor circuitry configured:
    to make a determination that one or more capabilities supported by the wireless terminal is temporarily not available at the wireless terminal, and
    based on the determination, to enter one of plural levels of restricted capability operation, the plural levels of restricted capability operation corresponding to plural degrees of severity of unavailability;
  transmitter circuitry configured to optionally transmit a safe mode indication over the radio interface to the access node.

Example Embodiment 36

The wireless terminal of Example Embodiment 35, wherein the safe mode indication has one of plural values corresponding to the plural levels of restricted capability operation.

Example Embodiment 37

The wireless terminal of Example Embodiment 36, wherein at least one of the plural values for the safe mode indication indicates that the wireless terminal has restricted a network independent wireless terminal capability.

Example Embodiment 38

The wireless terminal of Example Embodiment 36, wherein at least one of the plural values for the safe mode indication requests approval by the access node for the wireless terminal to restrict one or more wireless terminal capabilities.

Example Embodiment 39

The wireless terminal of Example Embodiment 36, wherein at least one of the plural values for the safe mode indication indicates that the wireless terminal has restricted wireless terminal capability to support a set of basic operations.

Example Embodiment 40

The wireless terminal of Example Embodiment 35, wherein the processor circuitry is configured to enter the one of plural levels of restricted capability autonomously in any RRC mode or during a transition between RRC modes.

Example Embodiment 41

The wireless terminal of Example Embodiment 40, wherein when the wireless terminal is in a connected mode the processor circuitry is configured to autonomously suspend non-configured and non-active capabilities without requesting approval from the access node.

Example Embodiment 42

The wireless terminal of Example Embodiment 35, wherein the transmitter circuitry is configured to transmit the safe mode indication over the radio interface to the access node upon occurrence of one or more of the following:
  the wireless terminal attempts to downgrade an active feature/capability(s) as a direct result of an internal condition of the wireless terminal;
  the access node attempts to reconfigure an active feature(s) of the wireless terminal that would affect/impact status/condition of the wireless terminal;
  the access node sends a message for a suspended feature or capabilities to the wireless terminal while the wireless terminal is in a safe mode operation;
  the wireless terminal attempts to establish a new connection or resume a suspended connection while in the safe mode operation; and
  the access node requests information regarding capability(ies) of the wireless terminal.

Example Embodiment 43

A method in a wireless terminal that participates in communications over a radio interface with an access node of a radio access network (RAN), the method comprising:
  making a determination that one or more capabilities supported by the wireless terminal is temporarily not available at the wireless terminal, and
  based on the determination, entering one of plural levels of safe mode operation, the plural levels of safe mode operation corresponding to plural degrees of severity of unavailability;
  optionally transmitting a safe mode indication over the radio interface to the access node.

Example Embodiment 44

The method of Example Embodiment 43, wherein the safe mode indication has one of plural values corresponding to the plural levels of safe mode operation.

Example Embodiment 45

The method of Example Embodiment 44, wherein at least one of the plural values for the safe mode indication indicates that the wireless terminal has restricted a network independent wireless terminal capability.

Example Embodiment 46

The method of Example Embodiment 44, wherein at least one of the plural values for the safe mode indication requests approval by the access node for the wireless terminal to restrict one or more wireless terminal capabilities.

Example Embodiment 47

The method of Example Embodiment 44, wherein at least one of the plural values for the safe mode indication indicates that the wireless terminal has restricted wireless terminal capability to support a set of basic operations.

Example Embodiment 48

The method of Example Embodiment 43, further comprising entering the one of plural levels of restricted capability autonomously in any RRC mode or during a transition between RRC modes.

Example Embodiment 49

The method of Example Embodiment 48, wherein when the wireless terminal is in a connected mode, the method further comprises autonomously suspending non-configured and non-active capabilities without requesting approval from the access node.

Example Embodiment 50

The method of Example Embodiment 43, further comprising transmitting the safe mode indication over the radio interface to the access node upon occurrence of one or more of the following:

the wireless terminal attempts to downgrade an active feature/capability(s) as a direct result of an internal condition of the wireless terminal;

the access node attempts to reconfigure an active feature(s) of the wireless terminal that would affect/impact status/condition of the wireless terminal;

the access node sends a message for a suspended feature or capabilities to the wireless terminal while the wireless terminal is in safe mode operation;

the wireless terminal attempts to establish a new connection or resume a suspended connection while in the safe mode operation; and the access node requests information regarding capability(ies) of the wireless terminal.

Example Embodiment 51

An access node of a radio access network (RAN) that communicates over a radio interface with a wireless terminal, the access node comprising:

receiver circuitry configured to receive a safe mode indication from the wireless terminal, the safe mode indication configured to indicate to the access node that one or more capabilities supported by the wireless terminal is temporarily not available at the wireless terminal;

processor circuitry configured to generate a message to the wireless terminal relating to a capability of the wireless terminal;

transmitter circuitry configured to transmit the message over the radio interface to the wireless terminal.

Example Embodiment 52

The access node of Example Embodiment 51, wherein the receiver circuitry is further configured to receive a list of available capabilities of the wireless terminal.

Example Embodiment 53

The access node of Example Embodiment 51, wherein the message is a UECapabilityEnquiry message configured to inquire concerning capability(ies) of the wireless terminal.

Example Embodiment 54

The access node of Example Embodiment 51, wherein the message is a RRCConnectionSetup message transmitted in a connection establishment procedure in response to receipt of the safe mode indication and configured to established a connection with the wireless terminal using a re-configuration of the wireless terminal which is consistent with the safe mode indication.

Example Embodiment 55

The access node of Example Embodiment 51, wherein the message is aRRCConnectionReject message transmitted in a connection establishment procedure in response to receipt of the safe mode indication.

Example Embodiment 56

The access node of Example Embodiment 51, wherein the message is a RRCCapabilityRequest message transmitted in response to receipt of the safe mode indication and configured to established a connection with the wireless terminal using a re-configuration of the wireless terminal which is consistent with the safe mode indication.

Example Embodiment 57

The access node of Example Embodiment 51, wherein the message is a RRCConnectionSetup message transmitted in a connection resume fallback procedure in response to receipt of the safe mode indication and configured to established a connection with the wireless terminal using a re-configuration of the wireless terminal which is consistent with the safe mode indication.

Example Embodiment 58

The access node of Example Embodiment 51, wherein the message is aRRCConnectionReject message transmitted in a connection resume fallback procedure in response to receipt of the safe mode indication.

Example Embodiment 59

The access node of Example Embodiment 51, wherein the message is a RRCConnectionReconfiguration message transmitted in a connection reconfiguration procedure which prompts generation of the safe mode indication from the wireless terminal.

Example Embodiment 60

The access node of Example Embodiment 51, wherein the message is a RRCConnectionReestablishment message transmitted in a connection reestablishment procedure in response to receipt of the safe mode indication.

Example Embodiment 61

The access node of Example Embodiment 51, wherein the message is a RRCConnectionReestablishmentReject message transmitted in a connection reestablishment procedure in response to receipt of the safe mode indication.

Example Embodiment 62

A method in an access node of a radio access network (RAN) that communicates over a radio interface with a wireless terminal, the method comprising:
receiving a safe mode indication from the wireless terminal, the safe mode indication configured to indicate to the access node that one or more capabilities supported by the wireless terminal is temporarily not available at the wireless terminal;
generating a message to the wireless terminal relating to a capability of the wireless terminal;
transmitting the message over the radio interface to the wireless terminal.

Example Embodiment 63

The method of Example Embodiment 62, further comprising receiving a list of available capabilities of the wireless terminal.

Example Embodiment 64

The access node of Example Embodiment 62, wherein the message is a UECapabilityEnquiry message configured to inquire concerning capability(ies) of the wireless terminal.

Example Embodiment 65

The access node of Example Embodiment 62, wherein the message is a RRCConnectionSetup message transmitted in a connection establishment procedure in response to receipt of the safe mode indication and configured to established a connection with the wireless terminal using a re-configuration of the wireless terminal which is consistent with the safe mode indication.

Example Embodiment 66

The access node of Example Embodiment 62, wherein the message is a RRCConnectionReject message transmitted in a connection establishment procedure in response to receipt of the safe mode indication.

Example Embodiment 67

The access node of Example Embodiment 62, wherein the message is a RRCCapabilityRequest message transmitted in response to receipt of the safe mode indication and configured to established a connection with the wireless terminal using a re-configuration of the wireless terminal which is consistent with the safe mode indication.

Example Embodiment 68

The access node of Example Embodiment 62, wherein the message is a RRCConnectionSetup message transmitted in a connection resume fallback procedure in response to receipt of the safe mode indication and configured to established a connection with the wireless terminal using a re-configuration of the wireless terminal which is consistent with the safe mode indication.

Example Embodiment 69

The access node of Example Embodiment 62, wherein the message is a RRCConnectionReject message transmitted in a connection resume fallback procedure in response to receipt of the safe mode indication.

Example Embodiment 70

The access node of Example Embodiment 62, wherein the message is a RRCConnectionReconfigure anon message transmitted in a connection reconfiguration procedure which prompts generation of the safe mode indication from the wireless terminal.

Example Embodiment 71

The access node of Example Embodiment 62, wherein the message is a RRCConnectionReestablishment message transmitted in a connection reestablishment procedure in response to receipt of the safe mode indication.

Example Embodiment 72

The access node of Example Embodiment 62, wherein the message is a RRCConnectionReestablishmentReject message transmitted in a connection reestablishment procedure in response to receipt of the safe mode indication.

Example Embodiment 73

A wireless terminal that participates in communications over a radio interface with an access node of a radio access network (RAN), the wireless terminal comprising:
receiving circuitry configured to receive from the access node an indication of access node capability to support the wireless terminal when the wireless terminal is operating in a restricted mode;
processor circuitry configured
to make a determination if the wireless terminal is or should be in a restrictive mode and, in response to the determination,
to generate a message responsive to the indication of access node capability; and
transmitting circuitry configured to transmit the message to the access node.

Example Embodiment 74

The apparatus of Example Embodiment 73, wherein the message responsive to the indication of access node capability is a connection release message in a case that the indication of access node capability indicates that the access node does not support the restricted mode.

Example Embodiment 75

The apparatus of Example Embodiment 73, wherein the message responsive to the indication of access node capability comprises one of an accept connection, reconfigure connection, or release connection in a case that the indication of access node capability indicates that the access node does support the restricted mode, and wherein the message includes an indication that the wireless terminal is in the restricted mode.

Example Embodiment 76

The wireless terminal of Example Embodiment 75, wherein the indication specifies one of plural level values depending on a corresponding one of plural types of capability restriction for the wireless terminal.

Example Embodiment 77

The wireless terminal of Example Embodiment 76, wherein at least one of the plural level values indicates that the wireless terminal has restricted a network independent wireless terminal capability.

Example Embodiment 78

A method in a wireless terminal that participates in communications over a radio interface with an access node of a radio access network (RAN), the method comprising:
  receiving from the access node an indication of access node capability to support the wireless terminal when the wireless terminal is operating in a restricted mode;
  making a determination if the wireless terminal is or should be in a restrictive mode and, in response to the determination,
  generating a message responsive to the indication of access node capability; and
  transmitting the message to the access node.

Example Embodiment 79

The method of Example Embodiment 78, wherein the message responsive to the indication of access node capability is a connection release message in a case that the indication of access node capability indicates that the access node does not support the restricted mode.

Example Embodiment 80

The method of Example Embodiment 79, wherein the message responsive to the indication of access node capability comprises one of an accept connection, reconfigure connection, or release connection in a case that the indication of access node capability indicates that the access node does support the restricted mode, and wherein the message includes an indication that the wireless terminal is in the restricted mode.

Example Embodiment 81

The method of Example Embodiment 80, wherein the indication specifies one of plural level values depending on a corresponding one of plural types of capability restriction for the wireless terminal.

Example Embodiment 82

The wireless terminal of Example Embodiment 81, wherein at least one of the plural values for the level of safe mode indication indicates that the wireless terminal has restricted a network independent wireless terminal capability.

Example Embodiment 83

An access node of a radio access network (RAN) that communicates over a radio interface with a wireless terminal, the access node comprising:
  processor circuitry configured to generate an indication of access node capability to support the wireless terminal when the wireless terminal operates in a restricted mode;
  transmitting circuitry configured to transmit the indication to the wireless terminal;
  receiving circuitry configured to receive an indication from the wireless terminal that the wireless terminal is in the restricted mode;
  wherein the processor circuitry is further configured:
    to make a determination, upon receipt of the indication from the wireless terminal, that a connection with the wireless terminal can be maintained in the restricted mode; and
    to generate a responsive message to the wireless terminal based on the determination.

Example Embodiment 84

The access node of Example Embodiment 83, wherein the responsive message is one of an accept, reconfigure, and release message.

Example Embodiment 85

The access node of Example Embodiment 83, wherein the transmitting circuitry is configured to transmit the indication in system information.

Example Embodiment 86

The access node of Example Embodiment 83, wherein the transmitting circuitry is configured to transmit the indication in response to a request from the wireless terminal.

Example Embodiment 87

The access node of Example Embodiment 83, wherein the processor circuitry is further configured to make provide a restriction level indication which indicates at least one of plural levels of restricted mode of the wireless terminal which is supported by the access node.

Example Embodiment 88

A method in an access node of a radio access network (RAN) that communicates over a radio interface with a wireless terminal, the method comprising:

generating an indication of access node capability to support the wireless terminal when the wireless terminal operates in a restricted mode;

transmitting the indication to the wireless terminal;

receiving an indication from the wireless terminal that the wireless terminal is in the restricted mode;

making a determination, upon receipt of the indication from the wireless terminal, that a connection with the wireless terminal can be maintained in the restricted mode;

generating a responsive message to the wireless terminal based on the determination.

Example Embodiment 89

The method of Example Embodiment 88, wherein the responsive message is one of an accept, reconfigure, and release message.

Example Embodiment 90

The method of Example Embodiment 88, further comprising transmitting the indication in system information.

Example Embodiment 91

The method of Example Embodiment 88, further comprising transmitting the indication in response to a request from the wireless terminal.

Example Embodiment 92

The method of Example Embodiment 88, further comprising providing a restriction level indication which indicates at least one of plural levels of restricted mode of the wireless terminal which is supported by the access node.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture. The instructions of such software are stored on non-transient computer readable media.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

It will be appreciated that the technology disclosed herein is directed to solving radio communications-centric issues and is necessarily rooted in computer technology and overcomes problems specifically arising in radio communications. Moreover, in at least one of its aspects the technology disclosed herein improves the functioning of the basic function of a wireless terminal and/or node itself so that, for example, the wireless terminal and/or node can operate more effectively by prudent use of radio resources.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims.

No claim element herein is to be construed under the provisions of 35 U.S.C. 112, sixth paragraph, unless the element is expressly recited using the phrase "means for."

What is claimed is:

1. A wireless terminal that participates in communications over a radio interface with an access node of a radio access network (RAN), the wireless terminal comprising:
receiving circuitry configured to receive from the access node an indication of access node capability to support the wireless terminal when the wireless terminal is operating in a restricted mode;
processor circuitry configured
to make a determination if the wireless terminal is or should be in a restrictive mode and, in response to the determination,
to generate a message responsive to the indication of access node capability; and
transmitting circuitry configured to transmit the message to the access node.

2. The apparatus of claim 1, wherein the message responsive to the indication of access node capability is a connection release message in a case that the indication of access node capability indicates that the access node does not support the restricted mode.

3. The apparatus of claim 1, wherein the message responsive to the indication of access node capability comprises one of an accept connection, reconfigure connection, or release connection in a case that the indication of access node capability indicates that the access node does support the restricted mode, and wherein the message includes an indication that the wireless terminal is in the restricted mode.

4. The wireless terminal of claim 3, wherein the indication specifies one of plural level values depending on a corresponding one of plural types of capability restriction for the wireless terminal.

5. The wireless terminal of claim 4, wherein at least one of the plural level values indicates that the wireless terminal has restricted a network independent wireless terminal capability.

6. A method in a wireless terminal that participates in communications over a radio interface with an access node of a radio access network (RAN), the method comprising:
receiving from the access node an indication of access node capability to support the wireless terminal when the wireless terminal is operating in a restricted mode;
making a determination if the wireless terminal is or should be in a restrictive mode and, in response to the determination,
generating a message responsive to the indication of access node capability; and
transmitting the message to the access node.

7. The method of claim 6, wherein the message responsive to the indication of access node capability is a connection release message in a case that the indication of access node capability indicates that the access node does not support the restricted mode.

8. The method of claim 6, wherein the message responsive to the indication of access node capability comprises one of an accept connection, reconfigure connection, or release connection in a case that the indication of access node capability indicates that the access node does support the restricted mode, and wherein the message includes an indication that the wireless terminal is in the restricted mode.

9. The method of claim 8, wherein the indication specifies one of plural level values depending on a corresponding one of plural types of capability restriction for the wireless terminal.

10. The wireless terminal of claim 9, wherein at least one of the plural values for the level of safe mode indication indicates that the wireless terminal has restricted a network independent wireless terminal capability.

11. An access node of a radio access network (RAN) that communicates over a radio interface with a wireless terminal, the access node comprising:
processor circuitry configured to generate an indication of access node capability to support the wireless terminal when the wireless terminal operates in a restricted mode;
transmitting circuitry configured to transmit the indication to the wireless terminal;
receiving circuitry configured to receive an indication from the wireless terminal that the wireless terminal is in the restricted mode;
wherein the processor circuitry is further configured:
to make a determination, upon receipt of the indication from the wireless terminal, that a connection with the wireless terminal can be maintained in the restricted mode; and
to generate a responsive message to the wireless terminal based on the determination.

12. The access node of claim 11, wherein the responsive message is one of an accept, reconfigure, and release message.

13. The access node of claim 11, wherein the transmitting circuitry is configured to transmit the indication in system information.

14. The access node of claim 11, wherein the transmitting circuitry is configured to transmit the indication in response to a request from the wireless terminal.

15. The access node of claim 11, wherein the processor circuitry is further configured to make provide a restriction level indication which indicates at least one of plural levels of restricted mode of the wireless terminal which is supported by the access node.

16. A method in an access node of a radio access network (RAN) that communicates over a radio interface with a wireless terminal, the method comprising:
generating an indication of access node capability to support the wireless terminal when the wireless terminal operates in a restricted mode;
transmitting the indication to the wireless terminal;
receiving an indication from the wireless terminal that the wireless terminal is in the restricted mode;
making a determination, upon receipt of the indication from the wireless terminal, that a connection with the wireless terminal can be maintained in the restricted mode;
generating a responsive message to the wireless terminal based on the determination.

17. The method of claim 16, wherein the responsive message is one of an accept, reconfigure, and release message.

18. The method of claim 16, further comprising transmitting the indication in system information.

19. The method of claim 16, further comprising transmitting the indication in response to a request from the wireless terminal.

20. The method of claim 16, further comprising providing a restriction level indication which indicates at least one of plural levels of restricted mode of the wireless terminal which is supported by the access node.

* * * * *